United States Patent

Hirosawa et al.

[11] 4,033,203
[45] July 5, 1977

[54] HYDRAULIC CONTROL SYSTEM FOR VEHICLE TRANSMISSION MEANS

[75] Inventors: Koichiro Hirosawa, Kariya; Kazuo Ishikawa, Aichi; Tsunehiko Ogasawara, Kariya; Noboru Murakami, Nagoya, all of Japan

[73] Assignee: Aisin Seiki Kabushiki Kaisha, Kariya, Japan

[22] Filed: Sept. 3, 1975

[21] Appl. No.: 610,074

[30] Foreign Application Priority Data

Sept. 17, 1974 Japan .......................... 49-107274
Sept. 17, 1974 Japan .......................... 49-107277

[52] U.S. Cl. .................................................. 74/869
[51] Int. Cl.² ........................................ B60K 21/00
[58] Field of Search .................... 74/867, 868, 869

[56] References Cited

UNITED STATES PATENTS

| | | | |
|---|---|---|---|
| 3,101,011 | 8/1963 | Tuck et al. | 74/868 X |
| 3,369,430 | 2/1968 | Haley | 74/867 X |
| 3,525,275 | 8/1970 | Lemieux | 74/868 |
| 3,546,973 | 12/1970 | Ohie et al. | 74/868 |
| 3,683,721 | 8/1972 | Uozumi et al. | 74/868 X |
| 3,688,608 | 9/1972 | Leach | 74/869 |
| 3,881,372 | 5/1975 | Miyauchi | 74/868 X |

Primary Examiner—Samuel Scott
Assistant Examiner—Lance W. Chandler
Attorney, Agent, or Firm—Finnegan, Henderson, Farabow & Garrett

[57] ABSTRACT

A hydraulic control system for a vehicle transmission including a plurality of hydraulically operated functional brake and clutch devices for providing a plurality of driving stages of different speed ratios, the system comprising a pressure regulator valve for providing a regulated line pressure and shift valves for transmitting the line pressure to selected ones of the frictional devices. Pressure control valves are provided between the shift valves and the brake or clutch devices which are operated in low speed range of the transmission to provide a time delay in the increase of the pressure for actuating the devices. The pressure regulator valve is provided with pressure increasing chambers which receive the outlet pressure from the pressure control valves to increase the line pressure when the transmission is shifted to the low speed range such as the first and second speed forward drive stage and the reverse drive stage.

7 Claims, 18 Drawing Figures

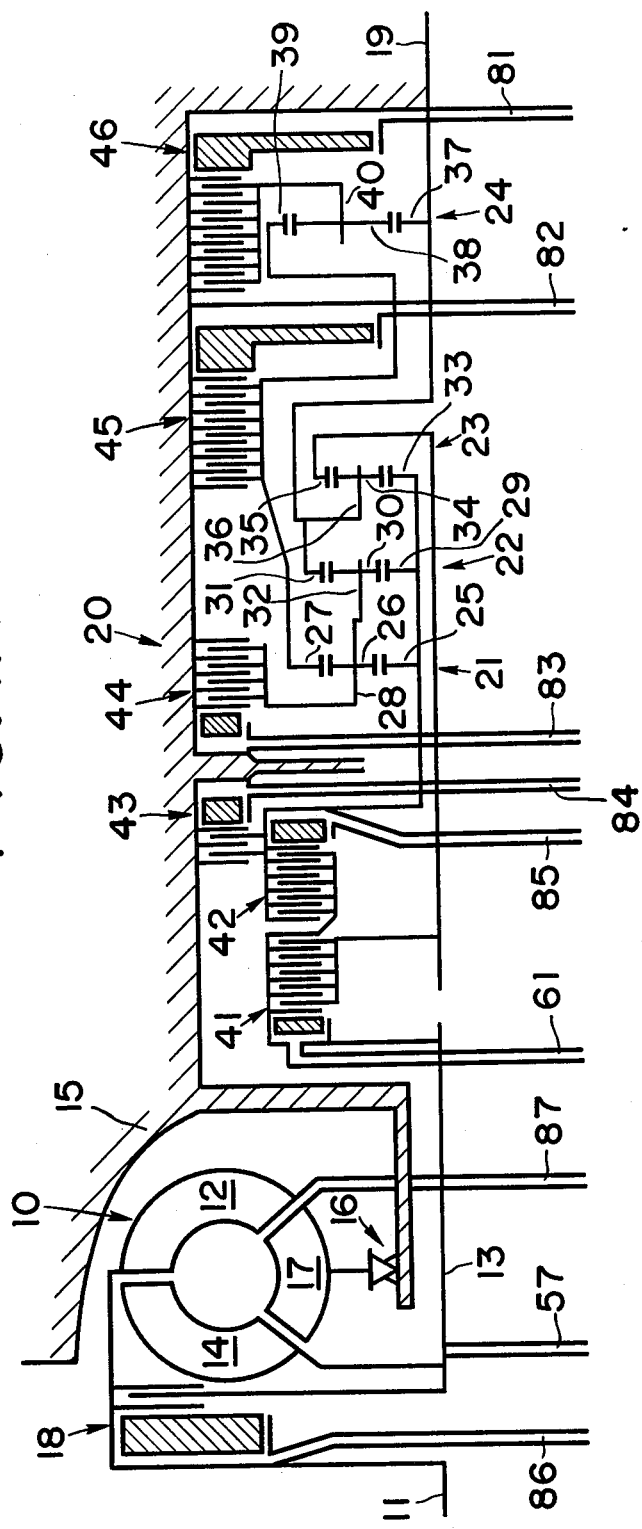

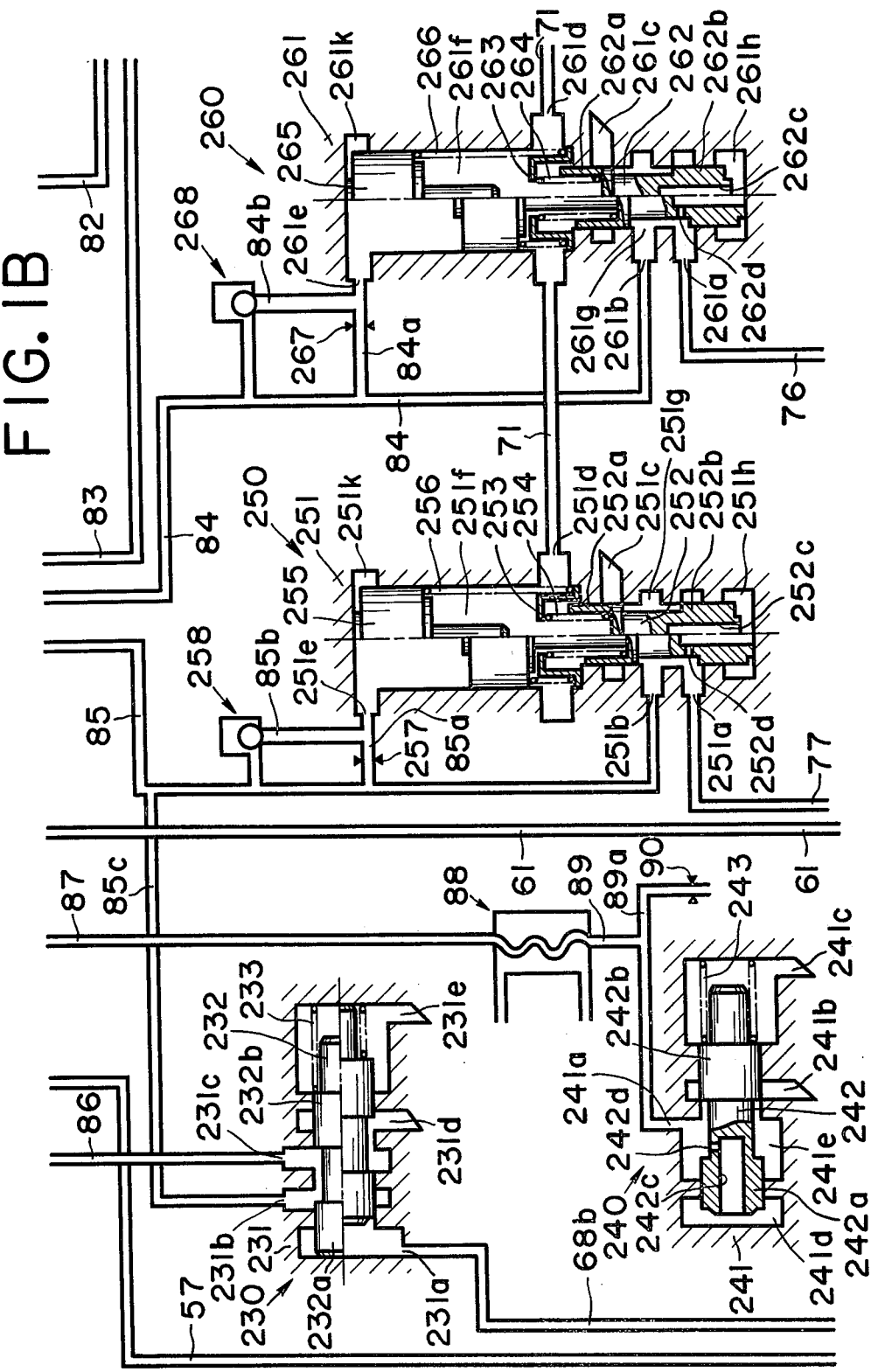

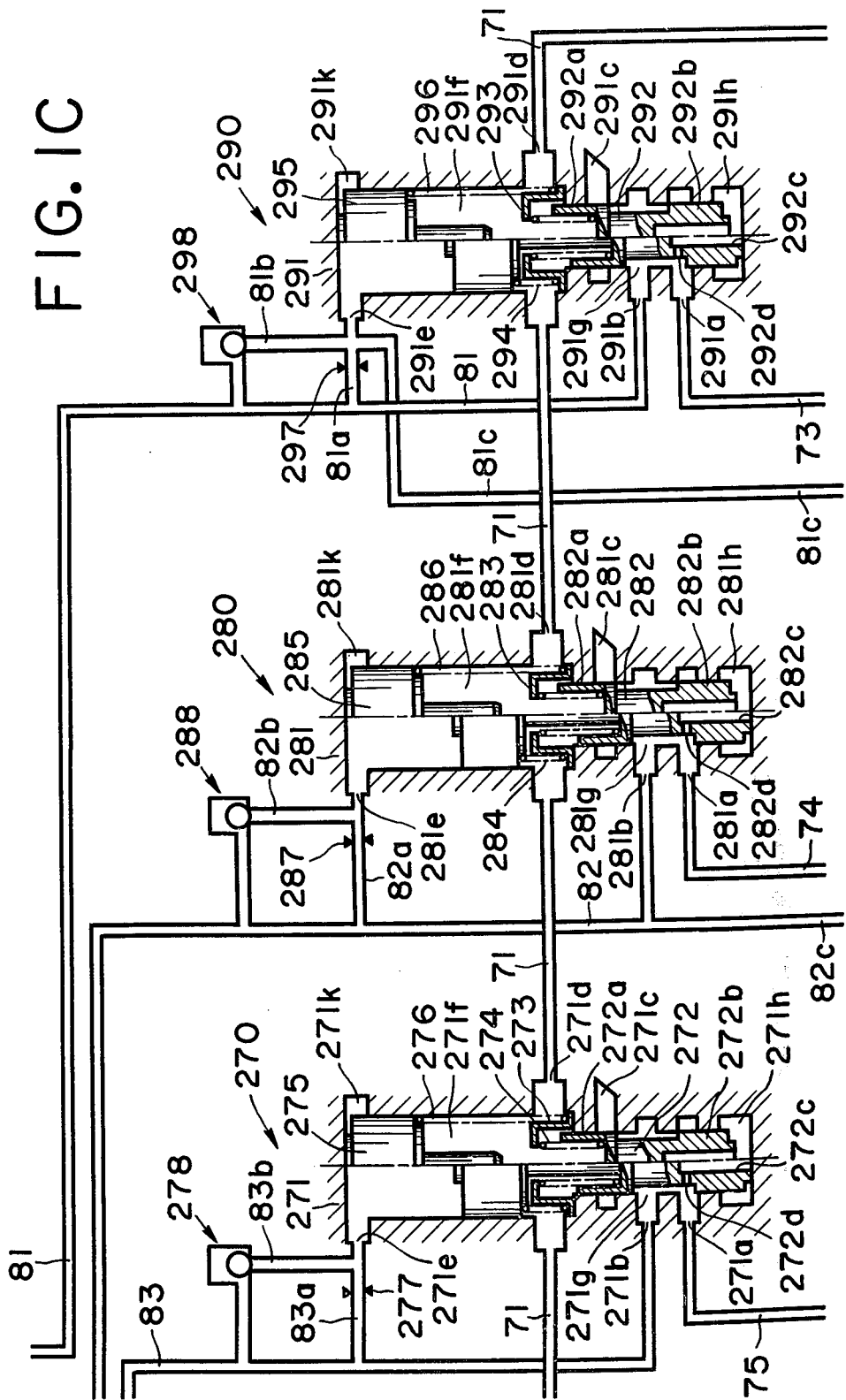

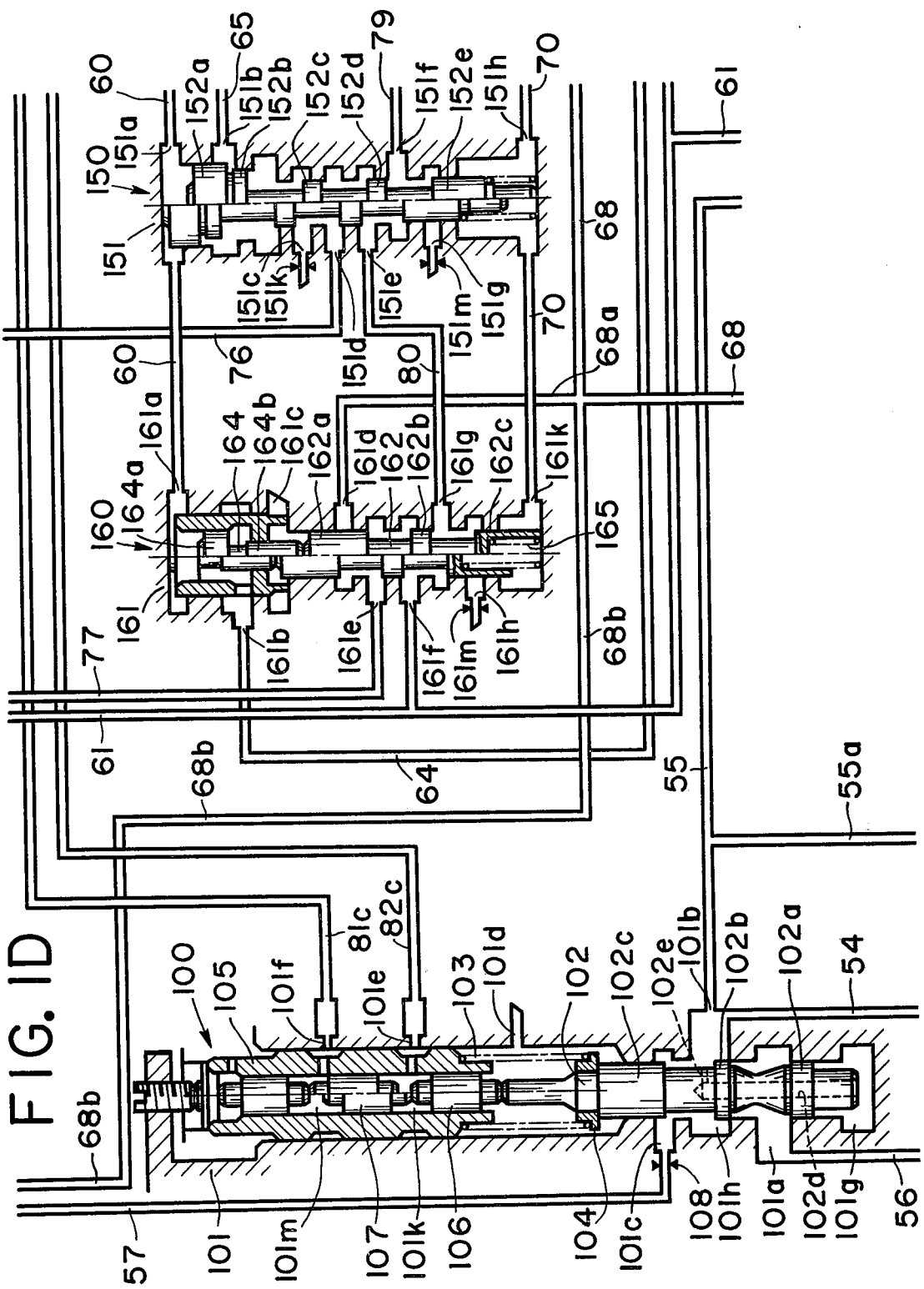

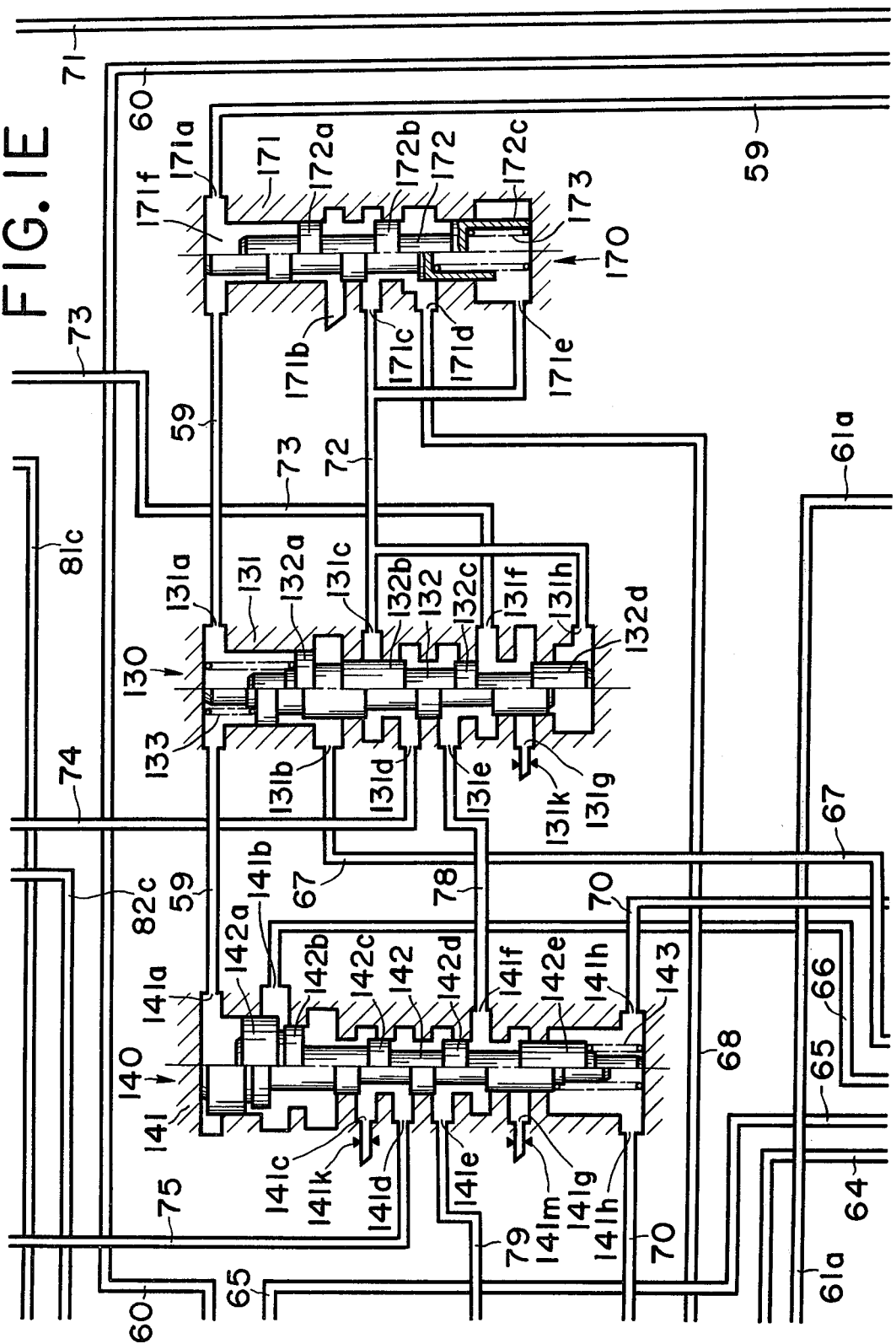
FIG. IE

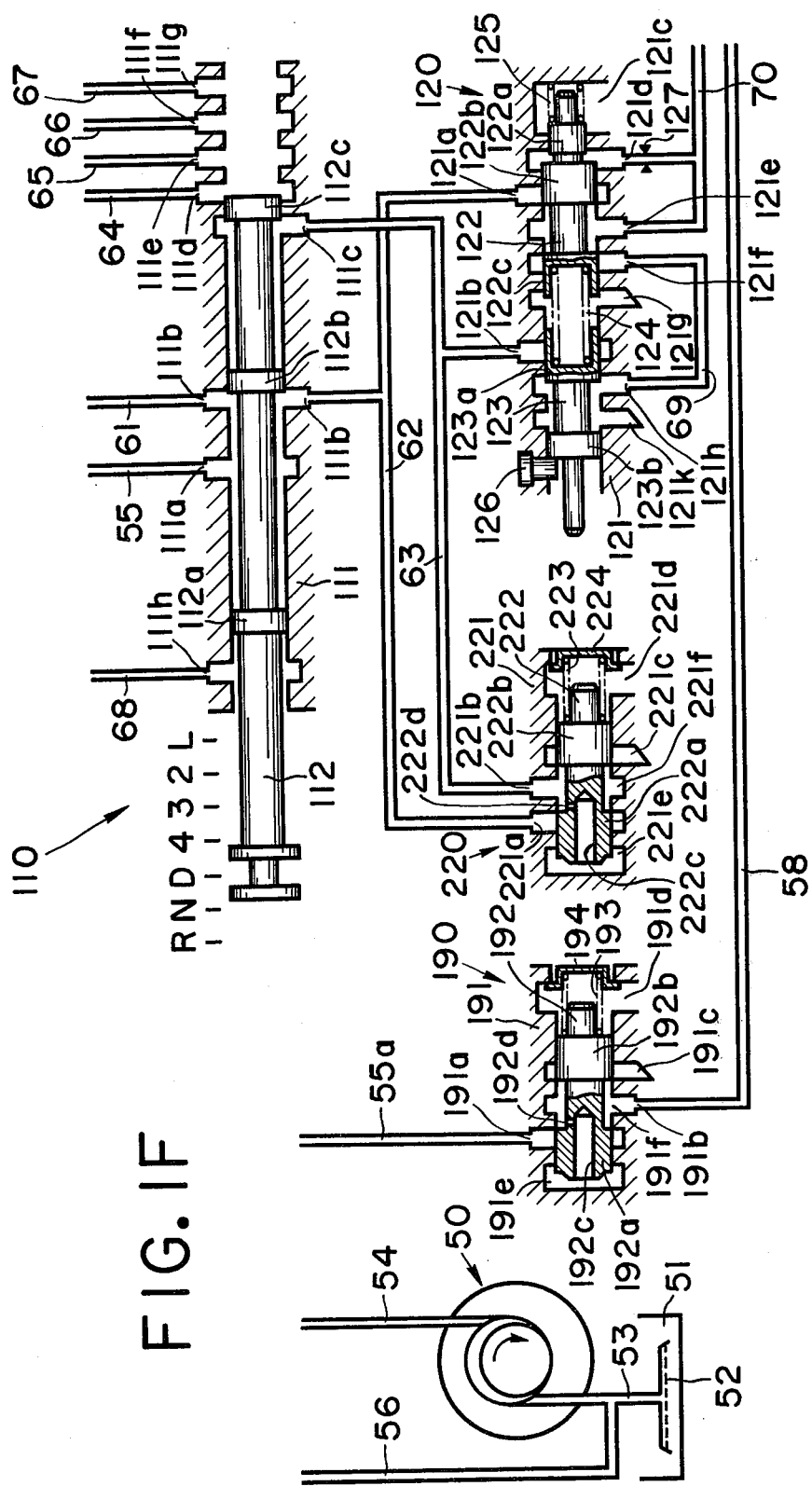

| | CLUTCH 18 | FIRST CLUTCH 41 | SECOND CLUTCH 42 | FIRST BRAKE 43 | SECOND BRAKE 44 | THIRD BRAKE 45 | FOURTH BRAKE 46 |
|---|---|---|---|---|---|---|---|
| Rev. | | | ● | | | ● | |
| N | | | | | | | |
| 5th | ○ | ● | ● | | | | |
| 4th | | ● | | ● | | | |
| 3rd | | ● | | | ● | | |
| 2nd | | ● | | | | ● | |
| Low | | ● | | | | | ● |

HYDRAULIC CONTROL SYSTEM FOR VEHICLE TRANSMISSION MEANS

BACKGROUND OF THE INVENTION

The present invention relates to transmissions for motor vehicles and, more particularly, to hydraulic control systems for such transmissions. More specifically, the present invention pertains to an automatic hydraulic control system for transmissions having a plurality of hydraulically operated frictional devices, such as hydraulic brake devices and hydraulic clutch devices, which are selectively brought into engagement for providing a plurality of drive stages having different speed transmission ratios.

In this type of transmission, it is important to provide a gradual transition from the disengaged to the engaged condition or vice versa of such hydraulically operated frictional devices in order to avoid engagement shocks sensed by the operator of the vehicle in which the transmission is installed. The U.S. Pat. No. 3,583,422 issued to Hnasjorg Dach et al. on June 8, 1971 and assigned to Zahnradfabrik Friederichshafen Aktiengesellschaft in Germany discloses a valve construction which may advantageously be employed for such a purpose.

Further, in this type of transmission, it has also been known that the hydraulically operated frictional devices are subjected to reaction forces of the torque which is being transmitted through the gear train of the transmission. Since the reaction forces are greater in low speed ranges, such as the first and second speed forward drive stages and the reverse drive stage of the transmission, than in high speed ranges, prior art further teaches to provide means for increasing the hydraulic pressure actuating the frictional device in the low speed ranges of the transmission. In actual practice, a pressure regulator valve is employed for providing a line pressure which is used to provide an actuating pressure to be selectively applied to frictional devices for effecting engagement thereof. The pressure regulator valve usually has a pressure increasing chamber to which, when the transmission is in the low speed range, the frictional device actuating pressure is fed back for increasing the line pressure. The increase in the line pressure results in a corresponding increase in the actuating pressure so that an adequate engagement effort is provided for resisting the reaction force applied to each of the frictional devices in operation.

According to the conventional arrangement, however, the frictional device actuating pressure is immediately fed back to the pressure regulator valve as soon as the transmission is shifted to the low speed range whereby the line pressure is rapidly increased to provide a high actuating pressure. Therefore, the frictional devices are rapidly brought into engagement producing engagement shocks which may be sensed by and uncomfortable to the vehicle operator.

The present invention has therefore an object to provide a hydraulic control system for vehicle transmissions in which increase in the frictional device engagement pressure is delayed to avoid engagement shocks.

Another object of the present invention is to provide a hydraulic control system for vehicle transmissions, in which the frictional device engagement pressure is maintained at the minimum required value for effecting the engagement thereof and, after the engagement is accomplished, the pressure is increased to a higher level which is adequate for maintaining the frictional device in engagement against reaction forces applied thereto.

A further object of the present invention is to provide a hydraulic control system for vehicle transmissions in which the frictional device actuating pressure when the transmission is in the low speed range can be increased higher than the pressure in the high speed range, and the increase in the actuating pressure is delayed until the engagement of the frictional device takes place in order to avoid an undesirable engagement shock.

SUMMARY OF THE INVENTION

According to the present invention, the above and other objects can be accomplished by a pressure control valve comprising a valve housing which has inlet port means, outlet port means and exhaust port means, a valve member disposed for axial movement in said housing and having land means for alternately connecting the outlet port means with the inlet and exhaust port means in response to the axial movement of the valve member, means for resiliently biasing the valve member in a direction of establishing a communication between the inlet and the outlet port means, said valve housing including a first chamber at an end of said valve member and connected with said outlet port means whereby pressure is introduced from the outlet port means into the first chamber forcing the valve member against the resilient bias means, a piston disposed in said valve housing for axial movement at the end of the valve member opposite to the first chamber, second resilient bias means for urging the piston in a direction opposite to the valve member, a second chamber defined in the valve housing at an end of the piston opposite to the valve member, and means for connecting said outlet port means through a restriction orifice means with the second chamber, said piston having a portion which is adapted, when pressure is established in said second chamber and the piston is displaced toward the valve member under the influence of the pressure in the second chamber, to engage the valve member to force it against the function of the pressure in the first chamber to establish the connection between the inlet and outlet port means.

The control valve receives at the inlet valve port means a substantially constant line pressure as regulated by a pressure regulator valve which includes a pressure increasing chamber as described previously. The outlet port means is connected with one of hydraulically operated frictional devices, such as hydraulic brake devices and hydraulic clutch devices, of the transmission gear mechanism so as to supply it with actuating hydraulic pressure. The second chamber is connected with the pressure increasing chamber so that, when pressure is established in the second chamber, the line pressure from the pressure regulator valve is increased. At the same time, the piston in the control valve serves to maintain the valve member to the position in which the inlet port means is opened to the outlet port means, whereby the increased line pressure is introduced into the associated frictional device to provide an increased engagement effort. Since the second chamber is connected through a restriction orifice means with the outlet port, the pressure increase in the second chamber is at a slow rate, so that there is a delay of time before the line pressure is increased. The delay time can be determined by the dimension of the orifice, the capacity of the second chamber and the stroke of the piston.

It is not necessary to feed back the outlet pressure from all of such control valves into the pressure regulator valve, but it may be sufficient that such outlet pressure feed back is performed only with respect to such control valves that come into function when the transmission is shifted to the low speed range.

According to a further feature of the present invention, there is provided a hydraulic control system for vehicle transmission means which includes a gear transmission provided with a plurality of frictional devices adapted to be selectively and hydraulically actuated to provide a plurality of driving stages of different speed ratios including a low speed range and a high speed range, said hydraulic control system including a hydraulic pressure source to provide a supply of pressurized hydraulic fluid, pressure regulator valve means connected with the hydraulic pressure source to receive the pressurized fluid therefrom and providing a regulated line pressure, said pressure regulating valve means including pressure increasing chamber means which serves, when subjected to a pressure, to increase the line pressure regulated by the pressure regulator valve means, shift valve means connected with the regulator valve means and supplying the line pressure from the regulator valve means to selected ones of the frictional devices, pressure control valve means disposed between the shift valve means and at least those frictional devices which are actuated in said low speed range of the transmission for providing a time delayed increase of pressure to the frictional devices for the low speed range of the transmission, and means for feeding back the pressure from the pressure control valve to the pressure increasing chamber means in the pressure regulator valve means so as to increase the line pressure therefrom.

The above and other objects and features of the present invention will become apparent from the following descriptions of a preferred embodiment taking reference to the accompanying drawings;

DETAILED DESCRIPTION OF THE PREFERRED EMBODIMENT

Figure 1:
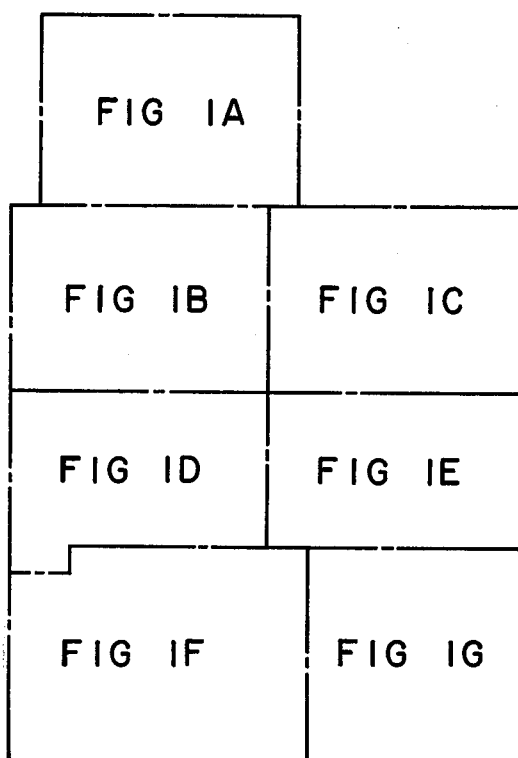
FIG. 1 is a diagrammatical illustration of general arrangements of several components which are used in the transmission assembly including the hydraulic control system in accordance with the present invention and illustrated in detail in sub-divided FIGS. 1A, 1B, 1C, 1D, 1E, 1F and 1G.

Referring now to the drawings, particularly to FIG. 1A, there is shown a transmission assembly to which the present invention is applied. The transmission assembly includes a torque converter 10 of a known three elements, single stage, two phase type which comprises a pump impeller 12 adapted to be connected with an engine output shaft 11, a turbine runner 14 and a stator wheel 17 which is carried by a case 15 through a one-way brake 16. The transmission assembly further includes a transmission 20 which has an input shaft 13 adapted to be connected with the turbine runner 14 of the torque converter 10. The torque converter 10 is provided with a lock-up clutch 18 for accomplishing direct connection among the pump impeller 12, the turbine runner 14 which is connected with the engine output shaft 11 and the input shaft 13 of the transmission 20. The transmission 20 is further provided with output shaft 19 which is disposed co-axially with the input shaft 13. Between the input shaft 13 and the output shaft 19, there are disposed, in this order, a first planetary gear set 21, a second planetary gear set 22, a third planetary gear set 23 and a fourth planetary gear set 24, all of single pinion type. The first planetary gear set 21 includes a first sun gear 25, first planetary gears 26 engaged with the first sun gear 25 and rotatably supported by a first carrier 28, and a first ring gear 27 engaged with the first planetary gear 26. Similarly, the second planetary gear set 22 includes a second sun gear 29, second planetary gears 30, a second ring gear 31 and a second planetary carrier 32. The third planetary gear set 23 includes a third sun gear 33, third planetary gears 34, a third ring gear 35 and a third planetary carrier 36. Further, the fourth planetary gear set 24 includes a fourth sun gear 37, fourth planetary gears 38, a fourth ring gear 39 and a fourth planetary carrier 40. A first clutch 41 is disposed between the third ring gear 35 and the input 13 of the transmission 20. The first, the second and the third sun gears 25, 29 and 33 are connected together so that they can rotate as a unit, and a second clutch 42 is disposed between the sun gear 25 and the input shaft 13. There is also provided a first brake 43 which serves to restrain the first, the second and the third sun gears 25, 29 and 33 against rotation. The first and the second planetary carriers 28 and 32 are connected together so that they rotate as a unit, and a second brake 44 is provided between the ring gears and the case 15 of the transmission 20 for restraining the planetary carriers 28 and 32 against rotation. The first and the fourth ring gears 27 and 39 are connected together so that they can rotate as a unit, and a third brake 45 is provided between the ring gears 27 and 39 and the case 15 of the transmission for restraining them against rotation. The second ring gear 31, the third planetary carrier 36, the fourth sun gear 37 and the output shaft 19 are connected together so that they can rotate as a unit. A fourth brake 46 is provided between the fourth planetary carrier 38 and the case 15 of the transmission 20 for restraining the fourth planetary carrier against rotation.

Figures 2, 3:
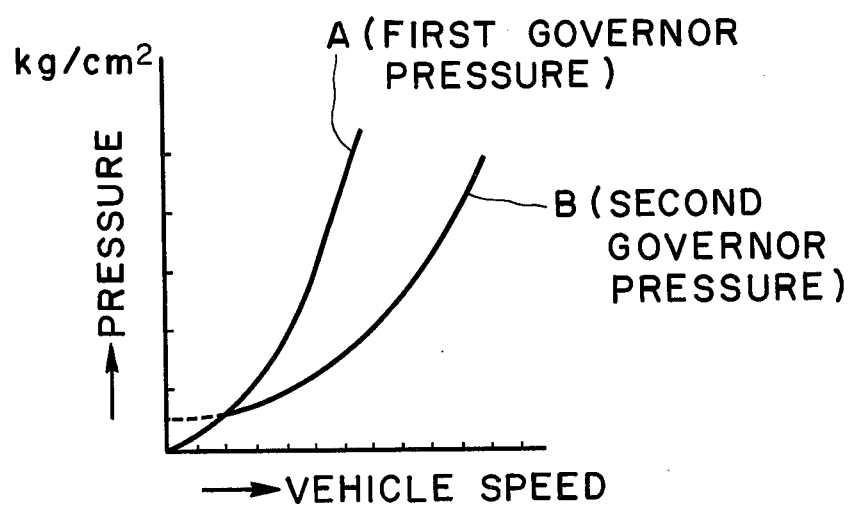
FIG. 2 is a chart showing the relationships between the possible driving stages of the illustrated gear transmission and the actuation of the hydraulically operated frictional devices.
FIG. 3 is a graph showing the change of governor pressure in accordance with vehicle speed.
Figure 4:
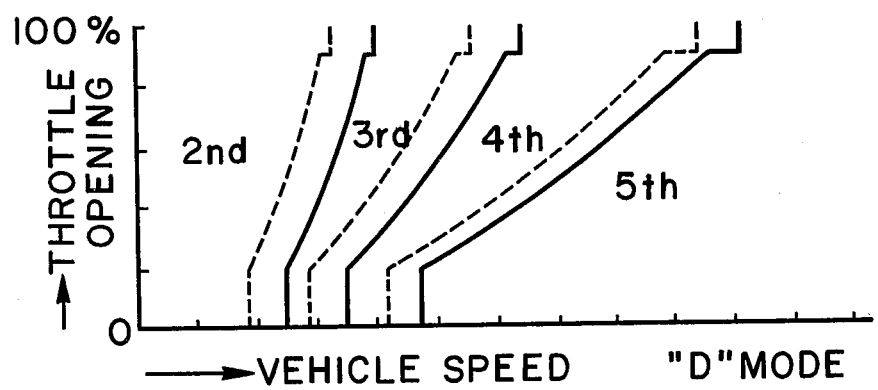
FIG. 4 is a graph showing the gear shifting pattern in "D" mode of operation.
Figure 5:
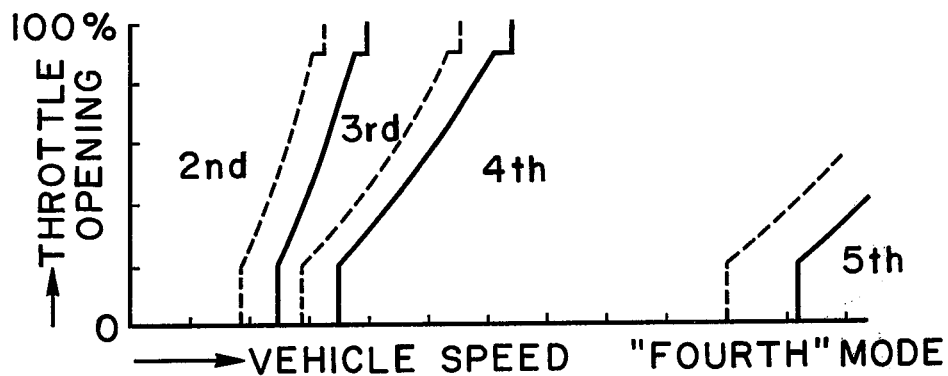
FIG. 5 is a graph similar to FIG. 4 but showing the gear shifting pattern in "fourth" mode of operation.
Figure 6:
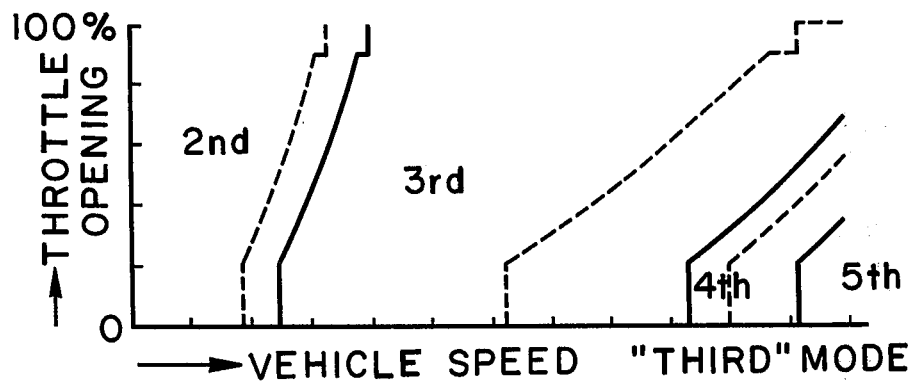
FIG. 6 is a graph similar to FIGS. 4 and 5 but showing the gear shifting pattern in "third" mode of operation.
Figure 7:
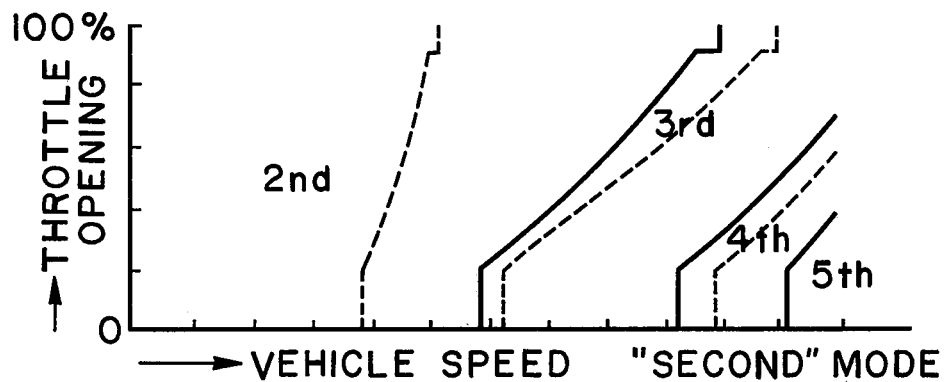
FIG. 7 is a graph similar to FIGS. 4, 5 and 6 but showing the gear shifting pattern in "second" mode of operation.
Figure 8:
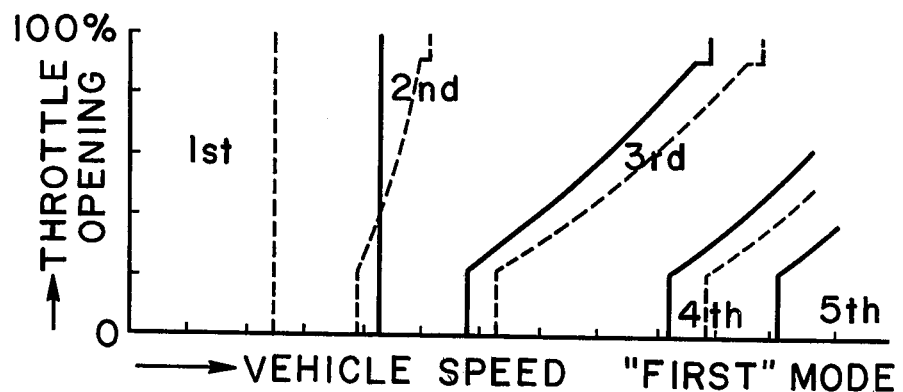
FIG. 8 is a graph similar to FIG. 4, 5, 6 and 7 but showing the gear shifting pattern in "first" or "L" mode of operation.

In the illustrated gear train, as shown in FIG. 2, the first clutch 41 and the fourth brake 46 are actuated or engaged to provide the first speed forward drive stage. When the first clutch 41 and the third brake 45 are actuated, there is provided a second speed forward drive stage. A third speed forward drive stage is provided when the first clutch 41 and the second brake 44 are actuated and a fourth speed forward drive stage is provided by actuating the first clutch 41 and the first brake 43. Further, a fifth speed forward drive stage is provided by actuating the first and the second clutches 41 and 42. A reverse drive stage is provided when the second clutch 42 and the third brake 45 are actuated.

The fluid pressure control system adapted to be used with the aforementioned transmission assembly is shown in FIGS. 1A through 1G. The control system includes a hydraulic pump 50 shown in FIG. 1F, a regulator valve 100 shown in FIG. 1D, a manually controlled valve 110 shown in FIG. 1F, a throttle valve 120, a 1–2 shift valve 130 shown in FIG. 1E, a 2–3 shift valve 140, a 3–4 shift valve 150 shown in FIG. 1D, a 4–5 shift valve 160, a reverse inhibitor valve 170 shown in FIG. 1E, a throttle modulator valve 180 shown in FIG. 1G, a line pressure cut-off valve 190, a first governor valve 200, a second governor valve 210, a down shift control valve 220, a lock-up clutch inhibitor valve 230 shown in FIG. 1B, a torque converter pressure control valve 240, a second clutch pressure control valve 250, a first brake pressure control valve 260, a second brake pressure control valve 270 shown in FIG. 1C, a third brake pressure control valve 280 and a fourth brake pressure control valve 290.

The hydraulic pump 50 is connected on one hand through an inlet line 53 having a filter 52 with an hydraulic fluid reservoir 51 and on the other hand with an output line 54. The hydraulic pump 50 is connected with the input shaft 13 of the gear transmission 20 to be driven therethrough by the engine output shaft 11. The outlet line 54 of the pump 50 is connected with a pressure line 55 which is connected with the regulator valve 100 and serves to supply regulated hydraulic pressure to the clutches 18, 41 and 42 as well as the brakes 43, 44, 45 and 46.

The regulator valve 100 shown in FIG. 1D serves to control the pressure in the line 55. The regulator valve 100 comprises a valve body 101 having an axial bore, a valve member 102 having axially spaced lands 102a, 102b and 102c of the same diameter for sliding engagement with the bore in the valve body 101, a spring 103 engaged with the valve member 102 through a spring seat 104 secured to the valve member for resiliently biasing it downwardly as seen in the drawing, a valve sleeve 105 disposed in the axial bore of the valve body 101 and secured thereto in the positon, and a pair of plugs 106 and 107 sealingly and slidably received in the hollow interior of the sleeve 105. The valve body 101 is provided with ports 101a, 101b, 101c, 101d, 101e and 101f, and also with chambers 101g, 101h, 101k and 101m. The port 101a which is an exhaust port is connected through a passage 56 with an inlet or suction line 53. The port 101d is also an exhaust port and connected with the reservoir 51. The port 101b is connected with the pump outlet line 54 and the pressure line 55. The port 101c is connected with the torque converter 10 through a passage 57 having an orifice 108 therein so as to provide a circulation of hydraulic fluid through the torque converter 10. the port 101e is in communication with the chamber 101k which is provided between the plugs 106 and 107. The port 101f communicates with the chamber 101m which is provided above the plug 107. The chamber 101h which is in communication with the port 101b is also always in communication through an axial bore 102d with the chamber 101g is provided beneath the valve member 102. The axial bore 102d is formed with an orifice 102e so as to prevent hunting movement of the valve member 102 when the regulator valve 100 is operation. The pressure line 55 has a branch line 55a which is in communication with the line pressure cutoff valve 190 at the inlet port 191a thereof.

The line pressure cut-off valve 190 shown in FIG. 1F includes a valve body 191 having a valve bore and valve ports 191a, 191b, 191c and 191d, a valve member 192 having a pair of spaced lands 192a and 192b which are slidably and sealingly received in the valve bore of the body 191, and a spring 193 which engages the valve member 192 through a valve seat member 194 so as to resiliently bias the valve member 192 toward left as seen in the drawing. The ports 191c and 191d are exhaust ports which are connected with the reservoir 51. The chamber 191e is provided between the land 192a and the valve body 191, and the chamber 191f is defined by the lands 192a and 192b and the valve body 191.

The chambers 191e and 191f are always in communication with each other through a passage 192c provided in the valve member 192 and having an orifice 192d therein. The chamber 191f is always in communication with the port 191b which is connected through a passage 58 with the first governor valve 200 at the inlet port 201a thereof so as to supply the first governor valve 200 with a substantially constant pressure which is adjusted by the valve 190 at a value lower than the line pressure.

Figure 1G:
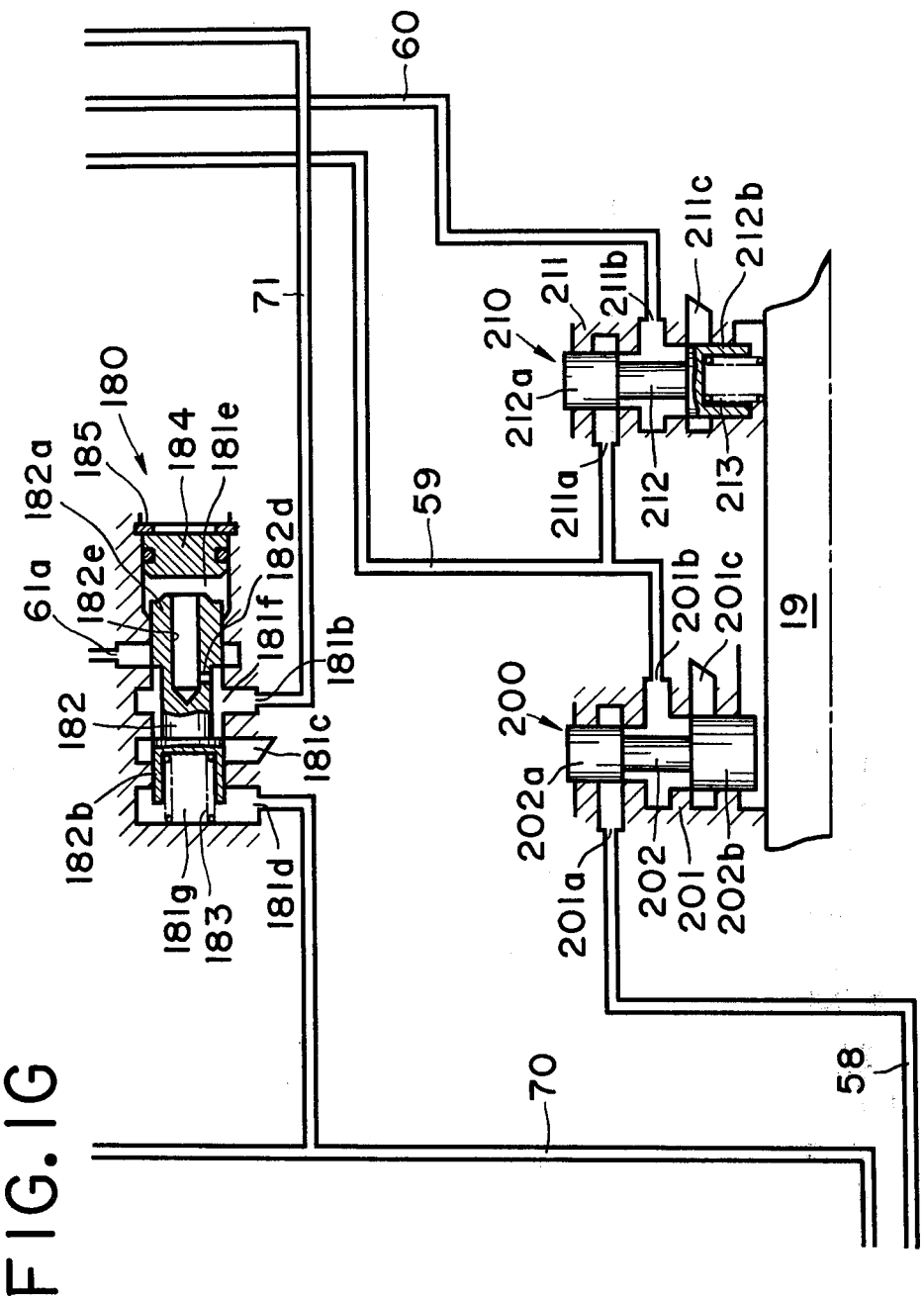

The first governor valve 200 which is shown in FIG. 1G comprises a valve body 201 having a valve bore and valve ports 201a, 201b and 201c, and a first valve member 202 having a small diameter land 202a and a large diameter land 202b which are sealingly and slidably received in the valve bore of the body 201. The port 201c is an exhaust port and connected with the reservoir 51. The valve body 201 is secured to the output shaft 19 of the transmission 20 so as to rotate therewith. The first governor valve 200 is so mounted on the output shaft 19 of the transmission 20 that the small diameter land 202a on the valve member 202 is located radially outward of the large diameter land 202b with respect to the output shaft 19. The port 201b is connected through a passage 59 with a port 211a of the second governor valve 210, a port 171a of the reverse inhibitor valve 170, a port 131a of the 1–2 shift valve 130 and a port 141a of the 2–3 shift valve 140.

The second governor valve 210 comprises a valve body 211 having a valve bore and ports 211a, 211b and 211c, a second valve member 212 having a small diameter land 212a and a large diameter land 212b which are sealingly and slidably received in the valve bore of the body 211, and a spring 213 for resiliently biasing the second valve member 212 toward radially outward direction. The port 211c is an exhaust port and connected with the reservoir 51. The second valve body 211 of the second governor valve 210 is secured to the output shaft 19 of the transmission 20 so as to rotate therewith. The valve body 211 may be formed integrally with the valve body 201 of the first governor valve 200. The port 211b is connected through a passage 60 with a port 151a of the 3-4 shift valve 150 and a port 161a of the 4-5 shift valve 160.

The manually controlled valve 110 shown in in 1F comprises a valve body 111 having a valve bore and valve ports 111a, 111b, 111c, 111d, 111e, 111f, 111g and 111h, and a valve member 112 having three spaced apart lands 112a, 112b and 112c which are sealingly and slidably received in the valve bore of the body 111. The port 111a is connected with the pressure line 55. The port 111b is i communication through a passage 61 with the servo chamber of the first clutch 41 and a first inlet port 161f of the 4-5 shift valve 160. The passage 61 is provided with a branch passage 61a which is connected with an inlet port 181a of the throttle modulator valve. The port 111b is connected through a passage 62 with an inlet port 221a of the down shift valve 220 and a first inlet port 121a of the throttle valve 120. The port 111c is connected through a passage 63 with a port 221b of the down shift valve 220 and a second inlet port 121b of the throttle valve 120. The port 111d is connected through a passage 64 with a port 161b of the 4-5 shift valve 160. The port 111e is connected through a passage 65 with a port 151b of the 3-4 shift valve 150. The port 111f is connected through a passage 66 with a port 141b of the 2-3 shift valve 140 and the port 111g is connected through a passage 67 with a port 131b of the 1-2 shift valve 130. The port 111h is in communication through a passage 68 with an inlet port 171d of the reverse inhibitor valve 170. The passage 68 is also provided with a branch passage 68a which is connected with a second inlet port 161d of the 4-5 shift valve 160, and with a second branch passage 68b with a port 231a of the lock-up clutch inhibitor valve 230.

The down shift control valve 220 comprises a valve body 221 having a valve bore and valve ports 221a, 221b, 221c and 221d, a valve member 222 having spaced lands 222a and 222b which are sealingly and slidably received in the valve bore of the body 221, and a spring 223 engaging the valve member 222 through a spring seat 224 for resiliently biasing the valve member 222 toward left as seen in the drawing. The ports 221c and 221d are exhaust ports which are connected with the reservoir 51.

A chamber 221e is defined between the land 222a and the valve body 221, and a chamber 221f is defined by the lands 222a and 222b and the valve body 221. The chambers 221e and 221f are always in communication with each other through a passage 222c formed in the valve member 222 and having an orifice 222d provided therein. The chamber 221f is always in communication with the port 221b and serves, through the passage 63, to supply the port 111c in the manually controlled valve 110 and the port 121b in the throttle valve 120 with a substantially constant pressure which is adjusted by the downshift control valve 220 to a value lower than the line pressure.

The throttle valve 120 shown in FIG. 1F comprises a valve body 121 having a valve bore and ports 121a, 121b, 121c, 121d, 121e, 121f, 121g, 121h and 121k, a valve member 122 having a small diameter land 122a and two large diameter lands 122b and 122c which are sealingly and slidably received in the valve body 121, a down shift valve member 123 having two lands 123a and 123b which have diameters equal to those of the lands 122b and 122c, a first spring 124 disposed between the valve members 122 and 123, and a second spring 125 adapted to resiliently bias the valve member 122 against the function of the first spring 124. The valve body 121 is provided with a stopper pin 126 for limiting leftward movement of the downshift valve member 123.

The down shift valve member 123 is connected through suitable means with a throttle actuating pedal (not shown) of a vehicle in which the transmission assembly is mounted in such a manner that it is displaced leftward as the throttle actuating member is actuated.

The ports 121c, 121g and 121k are exhaust ports and connected with the hydraulic reservoir 51. The ports 121f and 121h are connected together through a passage 69. The ports 121d and 121e are connected together through a passage 70 and are in communication with a port 141h of the 2-3 shift valve 140, a port 151h of the 3-4 shift valve 150, and a port 161h of the 4-5 shift valve 160. The passage 70 is provided with a branch passage 70a which is connected with a port 181d of the throttle modulator valve 180. The passage 70 is further formed at a position in the vicinity of the port 121d with an orifice 127 which serves to prevent fluctuation of the valve member 122.

The throttle modulator valve 180 shown in FIG. 1G comprises a valve body 181 having a valve bore and valve ports 181a, 181b, 181c and 181d, a valve member 182 having two equidiameter lands 182a and 182b which are sealingly and slidably received in the valve bore of the body 181, and a spring 183 for resiliently biasing the valve member 182 toward right as seen in the drawing. The valve bore in the body 181 is closed at its right end by a plug 184 which is retained in the position by means of a snap ring 185. A chamber 181g is formed between the land 182b of the valve member 182 and the valve body 181, and a chamber 181f is defined by the lands 182a and 182b of the valve member 182 and the valve body 181. A chamber 181e is further defined by the land 182a of the valve member 182, the valve body 181 and the plug 184.

The chambers 182e and 182f are in communication with each other through a passage 182c having an orifice 182d formed therein. The orifice 182d is provided in order to prevent fluctuation of the valve member 182. The chamber 181g is connected with the passage 70 through the port 181d so that it is supplied with throttle pressure from the throttle valve. The chamber 181f is connected through the port 181b with the passage 71. The port 181c is an exhaust port connected with the hydraulic reservoir 51.

The reverse inhibitor valve 170 comprises a valve body 171 having a valve bore and ports 171a, 171b, 171c, 171d and 171e, a valve member 172 having a large diameter land 172a and two small diameter lands 172b and 172c which are sealingly received in the valve bore of the body 171, and a spring 173 for biasing the valve member 172 upwardly as seen in the drawing.

A chamber 171f is defined between the large diameter land 172a and the valve body 171, and a chamber 171g is defined between the small diameter land 172c and the valve body 171. The chamber 171f is in communication through the port 171a with the governor pressure supply passage 59 from the first governor valve 200. The port 171b is an exhaust port connected with the hydraulic reservoir 51. The chamber 171g is communicated through the port 171e and the passage 72 with the port 171c and also with the ports 131c and 131h of the 1-2 shift valve 130. The port 171d is connected with the passage 68 as previously described and in communication with the port 111h of the manually controlled valve 110 so as to provide an inlet port for the line pressure when the valve member 112 is in the reverse position.

The 1-2 shift valve 130 shown in FIG. 1E comprises a valve body 131 having a valve bore and ports 131a, 131b, 131c, 131d, 131e, 131f, 131g and 131h, a valve member 132 having a large diameter land 132a, two medium diameter lands 132b and 132c and a small diameter land 132d which are sealingly and slidably received in the valve bore of the body 131, and a spring 133 for resiliently biasing the valve member 132 downwardly as seen in the drawing. The port 131g is an exhaust port and connected with the hydraulic reservoir 51. The exhaust port 131g is provided with an orifice 131k. As previously described, the port 131a is in communication with the passage 59 from the first governor valve, and the port 131b is connected through the passage 67 with the port 111g of the manually controlled valve 110. As previously described, the ports 131c and 131h are respectively connected with the ports 171c and 171e of the reverse inhibitor valve 170. The port 131d is connected through a passage 74 with the inlet port 281a of the third brake pressure control valve 280. The ports 131e and 131f are respectively connected through passages 78 and 73 with the port 141f of the 2-3 shift valve 140 and the inlet port 291a of the fourth brake pressure control valve 290.

The 2-3 shift valve 140 shown in FIG. 1E comprises a valve body 141 having a valve bore and ports 141a, 141b, 141c, 141d, 141e, 141f, 141g and 141h, a valve member 142 slidably received in the valve bore of the body and having a large diameter land 142a, a medium diameter land 142b of a diameter slightly smaller than that of the large diameter land 142a and three small diameter lands 142c, 142d and 142e of diameter slightly smaller than that of the medium diameter land 142b, and a spring 143 for resiliently biasing the valve member 142 upwardly as seen in the drawing.

The ports 141c and 141g are exhaust ports and connected with the reservoir 51. The exhaust ports 141c and 141g are respectively provided with orifices 141k and 141m. The port 141a is connected with the passage 59 from the first governor valve, and the port 141b is connected through a passage 66 with the port 111f of the manually controlled valve 110. The ports 141f and 141h are respectively connected through the passages 78 and 70 with the port 131e of the 1-2 shift valve 130 and the ports 121d and 121e of the throttle valve 120. The ports 141d and 141e are respectively connected through passages 75 and 79 with the port 271a of the second brake pressure control valve 270 and the port 151f of the 3-4 shift valve 150.

The 3-4 shift valve 150 shown in FIG. 1D comprises a valve body 151 having a valve bore and ports 151a, 151b, 151c, 151d, 151e, 151f, 151g and 151h, a valve member 152 slidably received in the valve bore of the body 151 and having a large diameter land 152a, a medium diameter land 152b with a diameter slightly smaller than that of the large diameter land 152a and three small diameter lands 152c, 152d and 152e with diameters smaller than that of the medium diameter land 152b, and a spring 153 for resiliently biasing the valve member upwardly as seen in the drawing.

The ports 151c and 151g are exhaust ports and connected with the hydraulic reservoir 51. The exhaust ports 151c and 151g are respectively provided with orifices 151k and 151m of suitable dimensions. As described previously, the port 151a is connected with the passage 60 from the second governor valve, and the port 151b is connected through the passage 65 with the port 111e of the manual control valve 110. The ports 151f and 151h are respectively connected through passages 79 and 70 with the port 141e of the 2-3 shift valve 140 and the ports 121d and 121e of the throttle valve 120. The port 151d is connected through the passage 76 with the port 261a of the first brake pressure control valve 260. The port 151e is in communication with the port 161g of the 4-5 shift valve 160 through a passage 80.

The 4-5 shift valve 160 shown in FIG. 1D comprises a valve body 161 having a valve bore and ports 161a, 161b, 161c, 161d, 161e, 161f, 161g, 161h and 161k, a first valve member 162 having two large diameter lands 162a and 162b and a small diameter land 162c which are sealingly and slidably received in the valve bore of the body 161, a sleeve 163 disposed above the valve member 162 and fixed to the bore of the valve body 161, a second valve member 164 slidably received in the sleeve 163 and having a large diameter land 164a with a diameter larger than those of the lands 162a and 162b, and a small diameter land 164b, and a spring 165 for resiliently biasing the valve members 162 and 164 upwardly as seen in the drawing.

The ports 161c and 161h are exhaust ports and connected with the hydraulic reservoir 51. The exhaust port 161h is provided with an orifice 161m of a suitable dimension. As described previously, the port 161a is connected with the second governor pressure line 60, and the port 161b is connected through the passage 64 with the port 111d of the manual control valve 110. The port 161d is connected through the passages 68 and 68a with the port 111h of the manual control valve 110. The ports 161f and 161g are connected respectively through passages 61 and 80 with the port 111b of the manual control valve 110 and the port 151e of the 3-4 shift valve 150, respectively. The port 161k is connected through the passage 70 with the ports 121d and 121e of the throttle valve 120. Further, the port 161e is connected through a passage 77 with the port 251a of the second clutch pressure control valve 250.

The fourth brake pressure control valve 290 shown in FIG. 1C comprises a valve body 291 having a valve bore including a large diameter portion and a small diameter portion, and ports 291a, 291b, 291c, 291d and 291e, a valve member 292 slidably received in the valve bore of the body 291 and having two spaced lands 292a and 292b, a spring 294 for resiliently biasing the valve member downwardly as seen in the drawing, a spring retainer 293 adapted to receive the upper end of the spring 294, a piston 295 slidably received in the large diameter portion of the valve body bore, and a spring 296 disposed between the piston 295 and the spring retainer 293 so as to urge the piston upwardly.

As previously described, the port 291a is connected through the passage 73 with the port 131f of the 1-2 shift valve 130, and the port 291d is connected through the passage 71 with the port 181b of the throttle modulator valve 180. The port 291c is an exhaust port and connected with the hydraulic reservoir 51. The port 291b is in communication through a passage 81 with the servo chamber of the servo device in the fourth brake 46. The passage 81 is provided with a branch passage 81a which has an orifice 297 and is connected with the port 291e.

Between the passages 81 and 81a, there is provided a bypass passage 81b which bypasses the orifice 297. The bypass passage 81b is provided with one-way valve 298 which allows liquid to pass therethrough only into the passage 81. A branch passage 81c is further provided in the passage 81a between the orifice 297 and the port 291e. The passage 81c is connected through the port 101f of the regulator valve 100 with the chamber 101m.

The second clutch pressure control valve 250, the first brake pressure control valve 260, the second brake pressure control valve 270 and the third brake pressure control valve 280 are identical in construction to the fourth brake pressure control valve 290, so that their structure will not be described in detail.

The third brake pressure control valve 280 shown in FIG. 1C includes a valve body 281 having ports 281a, 281b, 281c, 281d and 281e. As previously described, the port 281a is connected through the passage 74 with the port 131d of the 1-2 shift valve 130, and the port 281d through the passage 71 with the port 181b of the throttle modulator valve 180. The port 281c is an exhaust port and connected with the reservoir 51.

The port 281b is connected through a passage 82 with the servo chamber of the servo device in the third brake 45. The passage 82 is provided with a branch passage 82a which has an orifice 287 formed therein and is connected with the port 281e. Between the passages 82 and 82a, there is formed a bypass passage 82b which has a one-way valve 288. The one-way valve 288 allows a fluid flow toward the passage 82 but prevents a flow in the opposite direction. The passage 82 is further provided with a branch passage 82c which is connected through the port 101e of the regulator valve 100 with the chamber 101k.

The second brake pressure control valve 270 includes a valve body 271 having ports 271a, 271b, 271c, 271d and 271e. The port 271c is an exhaust port and connected with the hydraulic reservoir 51. As previously described, the port 271a is connected through the passage 75 with the port 141d of the 2-3 shift valve 140, and the port 271d is connected through the passage 71 with the port 181b of the throttle modulator valve 180. The port 271b is connected through a passage 83 with the servo chamber of the servo device in the second brake 44. The passage 83 is provided with a branch passage 83a which has an orifice 227 disposed therein and is connected with the port 271e. Between the passages 83 and 83a, there is provided a bypass passage 83b for bypassing the orifice 277. The bypass passage 83b is provided with a one-way valve 278 which allows fluid flow only into the passage 83.

The first brake pressure control valve 260 includes a valve body 261 having ports 261a, 261b, 261c, 261d and 261e. The port 261c is an exhaust port and connected with the reservoir 51. As previously described, the port 261a is connected through the passage 76 with the port 151d of the 3-4 shift valve 150, and the port 261d is connected through the passage 71 with the port 181b of the throttle modulator valve 180. The port 261b is connected through a passage 84 with the servo chamber of the servo device in the first brake 43. The passage 84 is provided with a branch passage 84a which is connected with the port 261e and has an orifice 267 disposed therein. Between the passages 84 and 84a,
there is provided a bypass passage 84b which bypasses the orifice 267 and is provided with a one-way valve 268 for permitting fluid flow only into the passage 84.

The second clutch pressure control valve 250 shown in FIG. 1B includes a valve body 261 having ports 251a, 251b, 251c, 251d and 251e. The port 251c is an exhaust port and connected with the hydraulic reservoir 51. As previously described, the port 251a is connected through the passage 77 with the port 161e of the 4-5 shift valve 160, and the port 251d is connected through the passage 71 of the port 181b of the throttle modulator valve 180. The port 251b is connected through a passage 85 with the servo chamber of the servo device in the second clutch 42. The passage 85 is provided with a branch passage 85a which is connected with the port 251e and has an orifice 257 disposed therein. The passage 85 is further provided with a branch passage 85c which is in communication with the port 231b of the lock-up clutch inhibitor valve 230. Between the passages 85 and 85a, there is provided a bypass passage 85b which bypasses the orifice 257. The bypass passage 85b is provided with a one-way valve 258 which allows fluid flow only into the passage 85.

The lock-up clutch inhibitor valve 230 shown in FIG. 1B includes a valve body 231 having a valve bore and ports 231a, 231b, 231c, 231d and 231e, a valve member 251 having two spaced lands 232a and 232b which are sealingly and slidably received in the valve bore of the body 231, and a spring 233 for resiliently biasing the valve member 232 toward left as seen in the drawing. The ports 231d and 231e are exhaust ports and connected with the hydraulic reservoir 51. The port 231a is connected through the passages 68b and 68 with the port 111h of the manual control valve 110. The port 231b is connected respectively through the passages 85c and 85 with the servo chamber of the second clutch 42 and with the port 251b of the second clutch pressure control valve 250. Further, the port 231b is connected through the passages 85c, 85 and 85a with the port 251e of the second clutch pressure control valve 250. The port 231c is connected through a passage 86 with the servo chamber of the servo device in the lock-up clutch 18.

The torque converter 10 shown in FIG. 1A has a circulation fluid outlet port which is connected through a passage 87 with an oil cooler 88. The oil cooler 88 has an outlet port which is connected through a passage 89 with the port 241a of the torque converter pressure control valve 240. The passage 89 is provided with a branch passage 89a which supplies, through an orifice 90, lubricant oil to several parts of the transmission 20.

The torque converter pressure control valve 240 shown in FIG. 1B comprises a valve body 241 having a valve bore and ports 241a, 241b and 241c, a valve member 242 sealingly and slidably received in the valve bore and having two spaced lands 242a and 242b, and a spring 243 for urging the valve leftward as seen in the drawing. The ports 241b and 241c are exhaust ports and connected with the hydraulic reservoir 51. The port 241a is connected with the passage 89 as previously described. Between the land 242a and the valve body 241, there is defined a chamber 241d, and a chamber 241e is defined by the lands 242a and 242b and the valve body 241. The chambers 241d and 241e are always in communication with each other through a passage 242c formed in the valve member 242 and having an orifice 242d disposed therein.

The operation of the aforementioned transmission control system will now be described. The pump 50 is driven by a vehicle engine to draw hydraulic fluid from the reservoir 51 through the filter 52 and the intake passage 53, and discharge under pressure to the outlet 54. The pressurized fluid in the outlet line 54 is introduced into the chamber 101h of the regulator valve 100 and then through the orifice 102e and the passage 102d into the chamber 101g. The pressure in the chamber 101g is applied to the land 102a and displaces the valve member 102 upwardly as seen in the drawing against the action of the spring 103. When the valve member 102 is thus shifted upwardly, the chamber 101h is brought into communication with the exhaust port 101a so that the pressure in the chamber 101h is decreased. This causes a corresponding decrease in the pressure in the chamber 101g, whereby the valve member 102 is moved downwardly until the communication between the chamber 101h and the exhaust port 101a is interrupted. In this manner, the regulator valve 100 provides a substantially constant pressure corresponding to the force of the spring 103.

When the transmission assembly is in the first, second or reverse speed stage position, the chamber 101m or 101k is supplied with the line pressure through the passage 81c or 82c. The line pressure thus introduced into the chamber 101m or 101k serves to force the valve member 102 downwardly against the pressure in the chamber 101g. Thus, the pressure regulated by the regulator valve 100 increases in either of the above positions to provide adequate hydraulic force required for frictional devices such as clutches and brakes which are engaged in these operational positions.

The port 101c of the regulator valve 100 is provided with an orifice 108 through which the port 101c is connected with the passage 57 leading to the torque converter 10. The pressure supplied to the torque converter 10 can be determined to a desired value by suitably determining the dimension of the orifice 108. The liquid discharged from the torque converter 10 is cooled by the oil cooler 88 and then passed through the orifice 90 to be used for lubrication purpose. The outlet pressure of the torque converter is controlled to a suitable constant value by the torque converter pressure control valve 240.

When the line pressure exists in the passage 55 which is in communication with the chamber 101h of the regulator valve 100, the line pressure is always applied to the inlet port 191a of the line pressure cut-off valve 190. The pressure is then introduced from the chamber 191f through the orifice 192d and the passage 192c into the chamber 191e to act on the land 192a, so that the valve member 192 is shifted toward right as seen in the drawing against the influence of the spring 193. As the valve member 192 is thus shifted toward right, the chamber 191f is finally brought into communication with the exhaust port 191c, and the pressure in the chamber 191f is decreased. In this manner, the line pressure cut-off valve 190 serves to provide a substantially constant pressure which corresponds to the force of the spring 193 and is lower than the line pressure. The constant pressure as adjusted by the valve 190 is then supplied through the port 191d and the passage 58 into the port 201a of the first governor valve 200.

When the vehicle is not running, the output shaft 19 is stationary. In this condition, the land 202a of the valve member 202 closes the inlet port 201a so that the first governor valve 200 does not produce the first governor pressure. Therefore, the second governor valve 210 does not produce the second governor pressure.

When the vehicle starts to run and the output shaft 19 of the transmission 20 is rotated, the first valve member 202 is shifted under the influence of the centrifugal force on the first valve member 202. Thus, the port 201a is opened to the port 201b and pressure builds up in the port 201b. The pressure in the port 201b serves to force the valve member 202 toward the output shaft 19 of the transmission against the influence of the centrifugal force acting thereon. Therefore, in the port 201b, there is built up the first governor pressure which corresponds to the speed of the output shaft 19 as shown by the curve A in FIG. 3. Since the first governor valve 200 is supplied with a substantially constant pressure which is lower than the line pressure, it is possible to obtain a relatively stable pressure as compared with an arrangement wherein the line pressure is directly introduced into the first governor valve 200.

The first governor pressure is applied to the reverse imhibitor valve 170, the 1–2 shift valve 130 and the 2–3 shift valve 140 to determine the positions of the valve members in these valves in accordance with the vehicle speed. The first governor pressure is also supplied to the inlet port 211a of the second governor valve 210.

The valve member 212 of the second governor valve 210 is biased radially outwardly of the output shaft 19 by the biasing spring 213, so that the pressure supplied to the inlet port 211a is introduced into the chamber defined between the large diameter land 212b and the small diameter land 212a of the valve member 212. The pressure introduced in the chamber serves to urge the valve member 212 radially inwardly of the output shaft 19 to shut-off the chamber from the inlet port 211a and open into the exhaust port 211c.

The valve member 212 of the secnd governor valve 210 has a mass which is smaller than that of the valve member 102 of the first governor valve 200, so that the second governor pressure increases slowly as compared with the first governor pressure in accordance with an increase in the vehicle speed as shown by the curve B in FIG. 3. The second governor pressure is supplied through the passage 60 to the 3–4 shift valve and 4–5 shift valve 160 to determine the positions of the valve members in these valves in accordance with the vehicle speed.

When the manually controlled valve 110 is in one of the forward drive positions, the line pressure in the passage 55 is supplied from the port 111b of the manual control valve 110 through the passage 62 to the inlet port 221a of the down shift pressure control valve 220 and the inlet port 121a of the throttle valve 120. Further, the line pressure is also supplied from the port 111b through the passage 61a into the inlet port 181a of the throttle modulator valve 180. When the down shift pressure control valve 220 is supplied at its inlet port 221a with the line pressure as described above, it functions in the same manner as the line pressure cut-off valve 190 and provides a substantially constant pressure which is lower than the line pressure and corresponds to the biasing force of the spring 223. The pressure thus produced by the down shift pressure control valve 220 is then applied to the port 121b of the throttle valve 120 and the port 111c of the manual control valve 110.

The pressure from the down shift pressure control valve 220 is supplied, in kick-down operation which will be described later, through the throttle valve 120 into the port 141h of the 2-3 shift valve 150, the port 151h of the 3-4 shift valve 150 and the port 161k of the 4-5 shift valve 160 to change over the valves in corresponding shift ranges shown in FIGS. 4 through 7. Further, the pressure from the down shift pressure control valve 220 is also supplied through actuation of the manual control valve 110 selectively to the port 131b, 141b, 151b or 161b of the shift valve 130, 140, 150 or 160 to change over the corresponding valve in corresponding shift range shown in FIGS. 5 through 8. In FIGS. 4 through 8, the dotted lines show shift down ranges and the solid lines show shift up ranges. The pressures from the down shift pressure control valve 220 must be sufficient for the purpose.

The throttle valve 120 has springs 124 and 125 which are so adjusted that, when the vehicle engine throttle valve (not shown) is not actuated and the downshift valve member 123 is at the extreme left position where it engages the pin 126, the valve member 122 is in the position wherein the land 122b closes the inlet port 121a. Thus, the throttle pressure is not produced until the vehicle engine throttle valve is opened and the downshift valve 123 is shifted toward right to increase the force of the spring 124 so that the inlet port 121a is opened by the land 122b.

Figure 9:
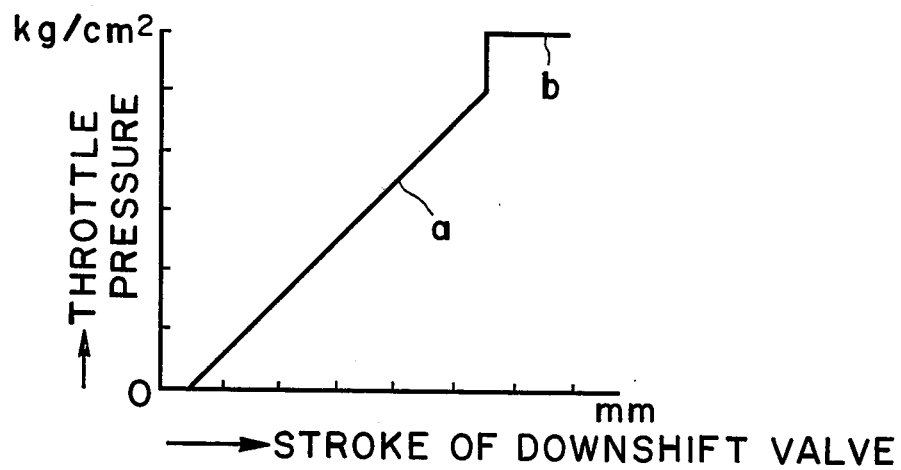
FIG. 9 is a graph showing the relationship between the stroke of the downshift valve and the throttle pressure.

As the vehicle engine throttle valve is opened to such a valve that the down shift valve 123 is shifted beyond a predetermined position, the compression force of the spring 124 is sufficiently increased to overcome the force of the spring 125 to cause the valve member 122 to move right until the inlet port 121a opened. The pressure at the inlet port 121a is then introduced through the port 121e, the passage 70 and the port 121d into the chamber defined between the lands 122a and 122b of the valve member 122. The pressure built up in the chamber serves to force the valve member 122 toward left against the influence of the spring 124 due to the difference in area between the lands 122a and 122b. Thus, the inlet port 121a is blocked from the chamber and the chamber is now opened to the port 121f which is connected through the passage 69 and the port 121h with the exhaust port 121k. As the port 121e communicates with the port 121f, the pressure in the passage 70 is decreased so that the valve member 122 is again shifted toward right under the influence of the spring 124 until the port 121e is disconnected from the port 121f and opens the port 121e to the inlet port 121a. In this manner, the throttle valve 120 provides a throttle pressure which changes proportionally in accordance with the change in the vehicle engine throttle valve opening as shown by (a) in FIG. 9. The throttle pressure is then supplied to the passage 70.

When the vehicle engine throttle valve actuating member is fully depressed, the down shift valve member 123 is shifted toward right until the land 126 on the member 123 blocks the communication between the exhaust port 121k and the port 121h, and the land 123a allows the port 121h to communicate with the port 121b. Thus, the pressure from the down shift pressure control valve 220 is supplied through the passage 69 to the port 121f.

As the down shift valve member 123 is rightwardly shifted as described above, the spring 124 is compressed and forces the valve member 122 toward right so that the land 122b on the valve member 122 is moved apart from the inlet port 121a to open the same. Thus, the pressurized liquid is introduced through the port 121e into the chamber defined between the lands 122a and 122b of the valve member 122. The pressure thus built up in the chamber serves to urge the valve member 122 toward left against the function of the spring 124 due to the difference in area between the lands 122a and 122b. Therefore, the communication between the ports 121a and 121e is interrupted by the land 121a, and the port 121e is opened to the port 121f. Since the port 121f is supplied with a substantially constant pressure which has been adjusted by the down shift pressure control valve 220 as described previously, the pressure is now introduced through the port 121e, the passage 70 and the port 121d into the chamber defined between the lands 122a and 122b of the valve member 122 to apply a leftwardly directed fluid force to the valve member 122 due to the difference in area between the lands 122a and 122b. Thus, the valve member 122 is hydraulically locked in the extreme left position to make the throttle valve ineffective. Therefore, the passage 70 is hereinafter supplied with a pressure adjusted by the down shift pressure control valve 220. Thus, the throttle pressure is suddenly increased when the vehicle engine throttle valve actuating member is depressed beyond a predetermined position as shown by line (b) in FIG. 9.

The throttle modulator valve 180 is supplied at the inlet port 181a with the line pressure and at the port 181d with the throttle pressure. The throttle pressure is introduced through the port 181d into the chamber 181g and serves, together with the spring 183 in the chamber 181g, to force the valve member 182 toward right as seen in the drawing. Therefore, the valve member 182 is held in the extreme right position to connect the chamber 181f to the port 181a and disconnect from the exhaust port 181c until the line pressure is supplied to the port 181a.

When the line pressure is supplied to the port 181a, the pressure is immediately introduced into the chamber 181f and then passed through the orifice 182d and the passage 182c into the chamber 181e to act the land 182a. Thus, the valve member 182 is displaced against the function of the spring 183 and the throttle pressure in the chamber 181g to close the inlet port 181a and opens the chamber 181f to the exhaust port 181c. In this manner, the ports 181a and 181c are suitably opened by the land 182a to produce in the chamber 181f a throttle modulator pressure which is higher than the throttle pressure by a valve corresponding to the force of the spring 183. The pressure is then supplied to the passage 71 and from the passage 71 respectively through the ports 291d, 281d, 271d, 261d and 251d into the chamber 291f of the fourth brake pressure control valve 290, the chamber 281f of the third brake pressure control valve 280, the chamber 271f of the second brake pressure control valve 270, the chamber 261f of the first brake pressure control valve 260 and the chamber 251f of the second clutch pressure control valve 250. The functions of the brake pressure control valves 290, 280, 270 and 260 and the second clutch pressure control valve 250 are the same so that only the function of the fourth brake pressure control valve 290 will be described.

The throttle modulator pressure introduced into the chamber 291f serves, in co-operation with the spring 296, to urge the piston upwardly and, at the same time, in co-operation with the spring 294, to urge the valve member 292 downwardly. In this situation, when the line pressure is supplied to the passage 73, the pressurized liquid is introduced from the port 291a into the chamber 291g and from the port 291b into the servo chamber of the fourth brake 46. Further, the pressure is passed through the liquid passage 81a having the orifice 297 therein and through the port 291e into the chamber 291k.

At the same time, the pressurized liquid in the chamber 291g is supplied through the orifice 292d and the passage 292c into the chamber 291h to act on the land 292b on the valve member 292. Thus, the valve member 292 is moved upwardly against the function of the spring 294 and the influence of the throttle modulator pressure until the inlet port 291a is closed by the land 292b of the valve member 292 and the chamber 291g is opened to the exhaust port 291c. In this manner, there is built up in the chamber 291g a pressure corresponding to the force of the spring 294 and the throttle modulator pressure. The pressure in the chambers 291g and 291h increases relatively rapidly until the piston in the servo device of the fourth brake 46 starts to move as shown in line (a) in FIG. 10. As the piston starts to move against its biasing force, the pressure remains substantially constant as shown by line (b) in FIG. 10 until the piston moves along its full stroke. The pressure again rapidly increases after the piston has moved to its terminal position of stroke until the fourth brake pressure control valve 290 starts to make pressure control function as shown by line (c) in FIG. 10. When the fourth brake pressure control valve 290 is performing the pressure control function, the pressure in the servo chamber is maintained substantially constant as shown by line d in FIG. 10 until the piston 295 abuts the valve member 292.

The substantially constant pressure in the servo chamber is maintained until the liquid pressure introduced through the liquid passages 81 and 812 into the orifice 297 displaces the piston 295 downwardly against the function of the spring 296 and the throttle modulator pressure in the chamber 291f to the position wherein the lower end of the piston abuts the upper end of the valve member 292. In this instance, the downward displacement of the piston 295 is delayed, the delay time being determined in accordance with the dimension of the orifice 297, the cross-sectional area of the chamber 291k and the length or stroke of the chamber. The delay time determines the duration of the line (d) in FIG. 10 and, at the same time, causes a time delay in increase of the liquid pressure in the chamber 101m of the regulator valve 100 and also a time delay in increase of the line pressure which is regulated by the regulator valve 100.

When the piston 295 is downwardly displaced to a position wherein the lower end of the piston 295 abuts the upper end of the valve member 292, the pressure in the chamber 291k starts to force the valve member 292 downwardly. Since the piston 295 has an effective area greater than that of the land 292b on the valve member 292, a downwardly directed force is applied to the valve member 292 to displace the same to a position wherein the ports 291a and 291b are connected together. In this position, the pressure in the passage 81 and therefore the pressure in the servo chamber of the fourth brake 46 is rapidly increased to a value equal to the line pressure as shown by line (e) in FIG. 10. As shown by dotted and broken lines in FIG. 10, the level of the pressure changes in accordance with the value of the throttle modulator pressure supplied from the port 291d.

Figure 10:
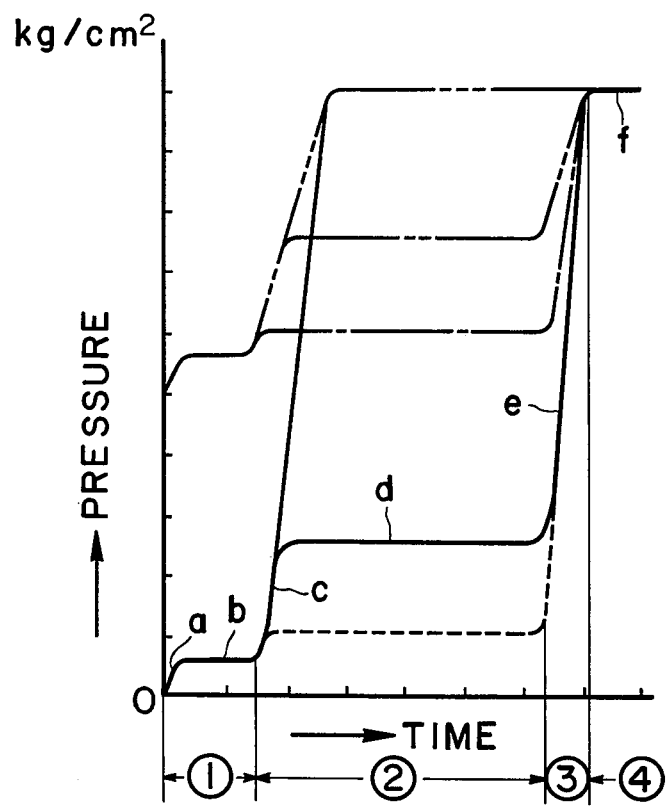
FIG. 10 graphically shows the change of outlet pressure from the third and fourth brake pressure control valves.

Thus, the pressure supplied to the fourth brake 46 is increased as shown in FIG. 10 and the fourth brake 46 is engaged very smoothly. The function of the fourth brake pressure control valve 290 is the same as those of the first brake pressure control valve 260, the second brake pressure control valve 270, the third brake pressure control valve 280 and the second clutch pressure control valve 250, so that the operations of the latter valves will not be described further, However, it should be noted herein that the second clutch pressure control valve 250, the first brake pressure control valve 260 and the second brake pressure control valve 270 are different from the third and fourth brake pressure control valves 280 and 290 in that the pressure adjusted by these pressure control valves is not directed to the pressure increasing chamber of the regulator valve 100, so that the line pressure is not increased when either of these valves is functioning (refer to FIG. 11).

The function of the transmission control system will now be described with respect to operation modes.

NEUTRAL MODE

The speed selector lever (not shown) in the driver's seat of the vehicle is placed to the neutral position so that the manually controlled valve 100 is put in the corresponding neutral position in which the line pressure is supplied from the line pressure passage 55 to the port 111a of the valve 110 but blocked by the lands 112a and 112b of the valve member 112 from entering any of the other valves and any of the servo chambers of brake and clutch means. Thus, the transmission is maintained at the neutral position. In this position, the line pressure is always supplied from the passage 55 through the passage 55a into the line pressure cut-off valve 190 so that, as far as the vehicle engine is in operation, the first governor valve 200 is supplied with pressurized liquid but the valve 200 does not produce the governor pressure when the vehicle is not running.

"L" MODE

When the selector valve is actuated to place the manual control valve at the "L" position, the line pressure from the passage 55 is supplied through the chamber between the lands 112a and 112b into the passages 61 and 62. From the passage 61, the line pressure is further supplied to the first clutch 41, the port 161f of the 4–5 shift valve 160, and the inlet port 181a of the throttle modulator valve 180. From the passage 62, the line pressure is supplied to the inlet port 221a of the downshift control valve 220 and the inlet port 121a of the throttle valve 120.

The downshift control valve 220 provides a substantially constant liquid pressure which is lower than the line pressure and will hereinafter be referred to as the "downshift pressure". The downshift pressure is introduced from the port 111c through the chamber between the lands 112b and 112c into the passages 64, 65, 66 and 67. The downshift pressure in the passage 64 is introduced therefrom through the port 161b of the 4–5 shift valve 160 into the chamber defined between the lands 164a and 164b of the valve member 164 and forces the valve member upwardly to the down shift position due to the difference in effective area of the lands 164a and 164b. Thus, the line pressure at the inlet port 161f of the 4–5 shift valve 160 is allowed to pass through the chamber between the lands 162b and 162c of the valve member 162 to the port 161g. The port 161g is connected through the passage 80 with the inlet port 151e of the 3-4 shift valve 150. In the 3-4 shift valve 150, the valve member 152 is hydraulically locked in the low speed position in this instance by the downshift pressure supplied from the passage 65 to the chamber defined between the lands 152a and 152c because there is a dfference in effective area therebetween. Therefore, the line pressure is passed through the chamber between the lands 152d and 152e of the valve member 152, the port 151f and the passage 79 to the port 141e of the 2-3 shift valve 140.

In the 2-3 shift valve 140, the valve member 142 is also maintained at the low speed position by the downshift pressure introduced from the passage 66, whereby the line pressure introduced into the inlet port 141e is passed through the chamber between the lands 142d and 142e of the valve member 142, the port 141f and the passage 78 to the inlet port 131e of the 1-2 shift valve 130. In the 1-2 shift valve 130, the valve member 132 is also positioned at the low speed position by the down shift pressure introduced from the passage 67 through the port 131b to the chamber between the lands 132a and 132b of the valve member 132 because there is a difference in effective area therebetween. Therefore, the line pressure at the port 131e is passed through the chamber between the lands 132c and 132d of the valve member 132, the port 131f and the passage 73 to the fourth brake pressure control valve 290.

The line pressure thus supplied to the fourth brake pressure control valve 290 is adjusted as shown in FIG. 10 and introduced into the servo chamber of the fourth brake 46 to actuate the fourth brake 46. The fourth brake 46 serves, in co-operation with the first clutch 41, to provide the first speed forward drive stage of the transmission 20. The pressure from the fourth brake pressure control valve 290 is also introduced into the pressure increasing chamber 101m of the regulator valve 100 so that the line pressure is slowly increased to a higher valve. Thus, the line pressure is increased to a value required for engagement of the fourth brake 46 without producing any shock during engagement of the brake 46.

The pressure in the passages 64, 65, 66 and 67 has been previously adjusted by the down shift control valve 220 to a substantially constant value which is lower than the line pressure, and the shift valves 130, 140, 150 and 160 include valve members having lands of appropriate area differences at portions where the pressure is introduced. Therefore, even if the selective lever is shifted to the "L" position during high speed operation of the vehicle, the governor pressure functions against the shift down pressure to prevent shift down of the transmission until the governor pressure is suitably decreased. Thus, the transmission is automatically shifted down to a driving stage suitable for the vehicle speed. This is effective to prevent over-speed operation of the vehicle engine during deceleration. Once the manual control valve 110 is placed at the "L" position and the transmission 20 is shifted down to the low speed drive range, the vehicle speed cannot be increased to a value sufficient to cause shifting up of the transmission (refer to FIG. 8).

"SECOND" MODE

When the manual control valve 110 is actuated to the "second" position by the selector lever, the line pressure is passed just the same as in the "L" mode. The downshift pressure from the port 111c is supplied to the passages 64, 65 and 66 but the passage 67 is not supplied with the down shift pressure. Thus, the 4-5 shift valve 160, the 3-4 shift valve 150 and the 2-3 shift valve 140 assume their low speed positions, and the line pressure is supplied from the passage 61 to the inlet port 131e of the 1-2 shift valve 130.

In this instance, the valve member 132 of the 1-2 shift valve 130 is held at the high speed position under the influence of the spring 133, so that the port 131e is connected through the chamber between the lands 132c and 132d of the valve member 132 to the port 131d. Therefore, the line pressure is introduced through the passage 74 to the third brake pressure control valve 280. The third brake pressure control valve 280 functions, when it is supplied with the line pressure, to effect a smooth engagement of the third brake 45 in the manner as previously described to accomplish the second speed forward drive stage. At the same time, the pressure as regulated by the third brake pressure control valve 280 is supplied to the pressure increasing chamber 101k of the regulator valve 100 so that the line pressure is increased to a higher value required for the engagement of the third brake 45.

Even if the selector lever is moved to the "second" position during high speed operation of the vehicle, the transmission is shifted down only to a driving stage corresponding to the governor pressure. Once the vehicle speed is decreased and the transmission is shifted down to the second speed foward drive stage, the vehicle speed cannot thereafter be increased to a value sufficient to cause shifting up of the transmission (refer to FIG. 7).

"THIRD" MODE

When the manually controlled valve 110 is shifted to the "third" position, the down shift pressure is cut-off from the passage 66. Thus, the liquid pressure is removed from the chamber between the lands 142a and 142b and the 2-3 shift valve 140 thereafter functions as a normal shift valve. The valve member 142 is subjected to the influences of the first governor pressure applied to the land 142a and the throttle pressure applied to the land 142e, so as to automatically determine the position of the transmission 20 either to the second or third speed forward driving stage. In this instance, the valve member 132 of the 1-2 shift valve 130 is held at the high speed position under the influence of the spring 133 and the first governor pressure applied to the large diameter land 132a. Therefore, the transmission is not shifted down to the first speed forward driving stage even when the vehicle speed is decreased (refer to FIG. 6).

Figure 11:
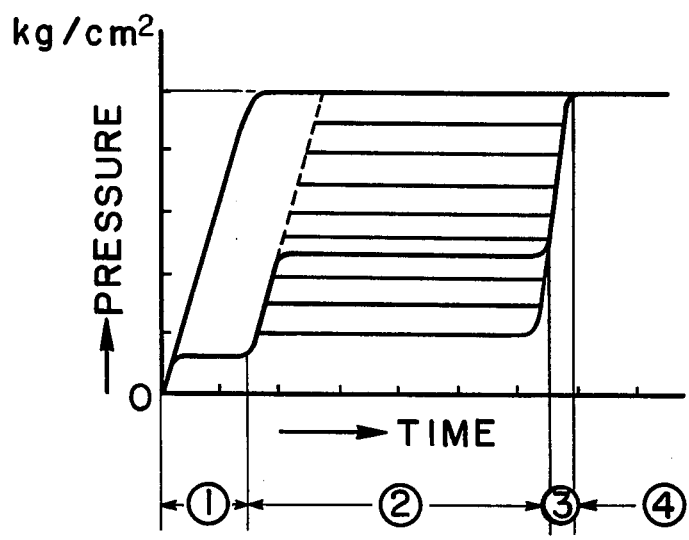
FIG. 11 graphically shows the change of outlet pressure from the first and second brake pressure control valves.

Further, when the transmission is in the third speed foward drive stage, the pressure increasing chambers 101m and 101k of the regulator valve 100 are not supplied with liquid pressure, so that the line pressure is not increased to the higher level. Thus, the second brake device is supplied from the second brake pressure control valve 270 with the actuating pressure which increases as shown in FIG. 11. The actuating pressure is of a sufficient level to provide frictional engagements in the brake and clutch devices in either of the third, fourth of fifth speed forward drive stages wherein the reaction forces are relatively small.

"FOURTH" MODE

When the manual control valve 110 is placed in the "fourth" position through actuation of the selector lever, the downshift pressure is cut-off from the chamber between the large diameter land 152a and the small diameter land 152b of the valve member 152 in the 3-4 shift valve 150. Thus, the 3-4 shift valve 150 as well as the 2-3 shift valve 140 comes under control of the governor pressure and the throttle pressure so as to perform automatic shifting of the transmission among the second, third and fourth drive stages. In this instance, as in the "third" mode, the transmission is not shifted down to the first speed forward drive stage. In the third and fourth speed drive stages, the line pressure remains at the lower level but, in the second speed forward drive stage, it increases to a higher level (refer to FIG. 5).

"D" MODE

When the manual control valve 110 is placed at the "D" position through actuation of the selector lever, the down shift pressure is further cut-off from the passage 64 which leads to the chamber between the large diameter land 164a and the small diameter land 164b of the valve member 164 in the 4-5 shift valve 160.

Therefore, all of the shift valves except the 1-2 shift valve 130, that is, the 2-3 shift valve 140, the 3-4 shift valve 150 and the 4-5 shift valve 160 come under the control of the governor pressure and the throttle pressure, and perform automatic shifting of transmission among the second, third, fourth and fifth speed forward drive stages. In this instance, as in the case of "fourth" mode, the transmission is not shifted to the first speed forward drive stage. Further, in the third, fourth and fifth speed forward drive stages, the line pressure remains at the lower level but, in the second speed forward drive stage, it is increased to the higher level (refer to FIG. 4).

It is preferable to provide different levels of line pressure for different drive stages. For this purpose, additional pressure increasing chambers may be provided in the regulator valve 100 in addition to the chambers 101k and 101m by providing opposed lands of different effective areas for each driving stage.

When the passage 85 is supplied with liquid pressure, the second clutch 42 is actuated. In this instance, the gear train of the transmission 20 provides 1 to 1 power transmission and, further, the torque converter 10 is also operated in the coupling range in which power is transmitted substantially without speed reduction. Therefore, in this condition, liquid pressure is supplied to the servo chamber of the direct connection clutch 18 from the passage 85 through the branch passage 85c and the lock-up clutch inhibitor valve 230 so as to actuate the clutch 18 and make the torque converter 10 ineffective.

"R" MODE

When the manually controlled valve 110 is shifted to the "R" position through actuation of the selector lever, the line pressure passage 55 is connected through the port 111a of the valve 110, the chamber defined by the lands 112a and 112b of the valve member 112 in the valve 110, and the port 111h to the passage 68. Thus, the line pressure is transmitted from the passage 68 through the port 171d of the reverse inhibitor valve 170 and, at the same time, through the branch passage 68a to the port 161d of the 4-5 shift valve 160 and through the passage 68b to the port 231a of the lock up clutch inhibitor valve 230.

The spring 173 of the reverse inhibitor valve 170 has a relatively low spring coefficient so that, even when the manual control valve 110 is inadvertently shifted to the "R" position during forward running of the vehicle, the governor pressure in the chamber 171f overcomes the spring 173 when the vehicle speed is greater than a predetermined value, for example, 20 km/h, to maintain the valve member 172 at the lower position in which the line pressure from the port 171d is blocked at the chamber between the lands 172b and 172c of the valve member 172. Thus, the transmission is prevented from being shifted to the reverse stage.

When the vehicle speed is below the predetermined value, the valve member 172 is shifted upwardly under the influence of the spring 173 whereby the port 171d is connected through the chamber between the lands 172b and 172c of the valve member 172 to the port 171c. Thus, the line pressure is supplied to the passage 72 and, from the passage 72, the line pressure is further introduced to the chamber 171g of the reverse inhibitor valve 170 to force the valve member 172 upwardly as seen in the drawing. This design is provided for preventing the reverse inhibitor valve from being shifted to the neutral position when the vehicle speed increases during the reverse drive beyond the predetermined value.

The line pressure is further transmitted from the passage 72 to the port 131h of the 1-2 shift valve 130 to displace the valve member 132 upward as seen in the drawing. Thus, the line pressure is supplied from the passage 72 through the chamber between the lands 132c and 132d of the valve member 132 to the port 131d which is in communication through the passage 74 and the third brake pressure control valve 280 to the third brake 45. Therefore, the third brake actuating pressure is gradually increased as shown in FIG. 10.

The branch passage 68a from the passage 68 is in communication with the port 161d of the 4-5 shift valve 160. Since the valve member 162 is in the upward position under the force of the spring 165, the line pressure is supplied from the passage 68a through the chamber between the lands 162a and 162b, and the port 161e to the passage 77. The line pressure is further supplied from the passage 77 to the second clutch pressure control valve 250 which then produces the second clutch actuating pressure which increases as shown by FIG. 10. The second clutch actuating pressure is applied to the servo chamber of the second clutch 42 to bring the second clutch 42 into smooth engagement.

In this instance, the branch passage 85c from the passage 85 is in communication with the port 231b of the lock up clutch inhibitor valve 230. Since the valve member 232 is at the right position in this instance under the action of the line pressure which has been supplied from the passage 68b to the port 231a of the lock up clutch inhibitor valve 230, the port 231b is blocked by the land 232a, and thus the pressure in the port 231b is prevented from being introduced into the servo chamber of the clutch 18 but the servo chamber is connected through the chamber between the lands 232a and 232b to the exhaust port 231d. Therefore, the clutch 18 is always in released condition. Since substantial torque amplification is required in the reverse drive, the torque converter 10 must always be in operation. For this purpose, the clutch 18 is maintained at the released condition by means of the lock up clutch inhibitor valve 230 as described above.

In the "R" mode, the second clutch 42 and the third brake 45 are brought into engagement to provide the reverse drive. In the reverse drive position, the liquid pressure as regulated by the third brake pressure control valve 280 is supplied through the passages 82 and 82c to the pressure increasing chamber 101k so that the line pressure is smoothly increased to a value which is sufficient to provide engagement of the third brake 45 during the reverse drive.

From the above descriptions of the preferred embodiment, it will be understood that, according to the present invention, when the gear transmission is being shifted to the low speed ranges, such as the first and second speed forward drive stages and the reverse drive stage, in which frictional devices such as brake devices and clutch devices are subjected to relatively high reaction forces as compared with the case in which the gear transmission is shifted to the high speed ranges, the frictional device actuating pressure is slowly and smoothly increased to avoid perceptive engagement shocks in the frictional devices. Further, the regulator valves functions to increase, in this instance, the line pressure to an adequate value for providing sufficiently high frictional device actuating pressure.

More specifically, according to the present invention, the frictional device actuating pressure is controlled by the pressure control valve in such a manner that the pressure is increased at first at a relatively high rate to a value adequate for initiating the movement of the frictional device into engagement direction and then maintained at a relatively constant value after the movement of the frictional device is initiated until the engagement is completed. When the engagement of the frictional device is completed, the pressure is again increased to a value which is sufficient to hold the frictional device in the engaged position without any slip against the reaction force to which the frictional device is possibly subjected during the operation of the transmission assembly.

The invention has thus been shown and described with reference to a specific preferred embodiment, however, it should be noted herein that the invention is in no way limited to the details of the illustrated arrangements or structures, but changes and modifications may be made without departing from the scope of the appended claims.

We claim:

1. A hydraulic control system for vehicle transmission means including a gear transmission provided with a plurality of frictional devices adapted to be selectively and hydraulically actuated to provide a plurality of driving stages of different speed ratios including a low speed range and a high speed range, said hydraulic control system comprising:
   a. a hydraulic pressure source to provide a supply of pressurized hydraulic fluid;
   b. pressure regulator valve means connected with the hydraulic pressure source for receiving the pressurized fluid and providing a regulated line pressure, said pressure regulating valve means including a pressure increasing chamber means which, when subjected to a pressure, increases the line pressure regulated by the pressure regulator valve means;
   c. shift valve means connected with the regulator valve means for directing the line pressure from the regulator valve means to selected ones of said frictional devices;
   d. pressure control valve means disposed between said shift valve means and at least those frictional devices which are actuated in said low speed range of the transmission for providing a delay of time in the increase of pressure to the frictional devices for the low speed range of the transmission, said control valve means comprising:
      1. a valve housing which has inlet port means, outlet port means and exhaust port means;
      2. a valve member disposed for axial movement in said housing and having land means for alternately connecting the outlet port means with the inlet and exhaust port means in response to the axial movement of the valve member;
      3. means for resiliently biasing the valve member in a direction for establishing a communication between the inlet and outlet port means;
      4. said valve housing including a first chamber at an end of said valve member and connected with said outlet port means whereby pressure is introduced from the outlet port means into the first chamber, forcing the valve member against said resilient bias means;
      5. a piston disposed in said valve housing for axial movement at the end of the valve member opposite said first chamber;
      6. second resilient bias means for urging the piston in a direction opposite to the valve member;
      7. a second chamber designed in the valve housing at an end of the piston opposite to the valve member; and
      8. means for connecting said outlet port means through a restriction orifice means with the second chamber, said piston having a portion which is adapted, when pressure is established in said second chamber and the piston is displaced toward the valve member under the influence of the pressure in the second chamber, to engage the valve member to force it against the function of the pressure in the first chamber to establish the connection between the inlet and outlet port means, said inlet port means being connected with the pressure regulating valve means to receive the regulated line pressure therefrom, and said outlet port means being connected to said frictional device; and
   e. means for feeding back the pressure from the pressure control valve to the pressure increasing chamber means in the pressure regulator valve means so as to increase the line pressure therefrom.

2. Hydraulic control system in accordance with claim 1 in which said second chamber is connected with the pressure increasing chamber means of the pressure regulator valve means to feed back the output pressure of the pressure control valve means with a time delay.

3. Hydraulic control system in accordance with claim 1 which further includes throttle pressure valve means which is connected with the pressure regulating valve means for receiving the regulated line pressure therefrom and providing a throttle pressure which corresponds to engine throttle valve opening, means being provided for introducing the throttle pressure between the valve member and the piston in the pressure control valve means.

4. Hydraulic control system in accordance with claim 1 in which the piston in the pressure control valve means has an effective area at said second chamber which is greater than that of the valve member at the first chamber.

5. Pressure control valve comprising a valve housing which has inlet port means, outlet port means and exhaust port means, a valve member disposed for axial movement in said housing and having land means for alternately connecting the outlet port means with the inlet and exhaust port means in response to the axial movement of the valve member, means for resiliently biasing the valve member in a direction of establishing a communication between the inlet and the outlet port means, said valve housing including a first chamber at an end of said valve member and connected with said outlet port means whereby pressure is introduced from the outlet port means into the first chamber and force the valve member against the resilient bias means, a piston disposed in said valve housing for axial movement at the end of the valve member opposite to the first chamber, second resilient bias means for urging the piston in a direction opposite to the valve member, a second chamber defined in the valve housing at an end of the piston opposite to the valve member, and means for connecting said outlet port means through restriction orifice means with the second chamber, said piston having a portion which is adapted, when pressure is established in said second chamber and the piston is displaced toward the valve member under the influence of the pressure in the second chamber, to engage the valve member to force it against the function of the pressure in the first chamber to establish the connection between the inlet and outlet port means.

6. Pressure control valve in accordance with claim 5 in which a third chamber is further defined between the valve member and the piston.

7. Pressure control valve in accordance with claim 5 in which the piston has an effective area, at the second chamber, which is greater than that of the valve member at the first chamber.

* * * * *